US012801462B2

(12) United States Patent
Qadir

(10) Patent No.: US 12,801,462 B2
(45) Date of Patent: Nov. 17, 2026

(54) INTEGRATED CIRCUIT WITH HARDWARE SEMAPHORE

(71) Applicant: Nordic Semiconductor ASA, Trondheim (NO)

(72) Inventor: Omer Qadir, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 121 days.

(21) Appl. No.: 18/612,716

(22) Filed: Mar. 21, 2024

(65) Prior Publication Data

US 2024/0320062 A1 Sep. 26, 2024

(30) Foreign Application Priority Data

Mar. 24, 2023 (GB) ..................................... 2304343

(51) Int. Cl.
*G06F 9/52* (2006.01)

(52) U.S. Cl.
CPC .................................... *G06F 9/526* (2013.01)

(58) Field of Classification Search
CPC ........................................................ G06F 9/526
See application file for complete search history.

(56) References Cited

U.S. PATENT DOCUMENTS 4,594,657 A 6/1986 Byrns
5,457,789 A * 10/1995 Dietrich, Jr. ........ G06F 12/1483 711/100
5,941,975 A * 8/1999 Park ........................ G06F 9/526 710/200
11,321,265 B2 5/2022 Dekens
2003/0149820 A1 * 8/2003 Kolinummi ............. G06F 9/526 710/200

(Continued)

FOREIGN PATENT DOCUMENTS

WO 2023/274928 A1 1/2023

OTHER PUBLICATIONS

Tanenbaum, Andrew; Structured Computer Organization; 2013; Pearson Education, Inc.; 6th Edition; p. 8. (Year: 2013).*

(Continued)

*Primary Examiner* — Eric T Loonan
(74) *Attorney, Agent, or Firm* — Klarquist Sparkman, LLP

(57) ABSTRACT

There is disclosed an integrated circuit which has a hardware semaphore that stores a value, and asynchronous hardware logic circuitry for operating the hardware semaphore. The asynchronous hardware logic circuitry has a hardware synchronization mutex which can be switched between any of one or more acquired states and an unacquired state, and has a first input for receiving requests to change the value of the hardware semaphore. In response to receiving one of said requests at the first input, if the synchronization mutex is unacquired, the asynchronous hardware logic circuitry switches the synchronization mutex to an acquired state, changes the value of the hardware semaphore in response to the request, then switches the synchronization mutex to being unacquired. If the synchronization mutex is acquired, the asynchronous hardware logic circuitry does not change the value of the hardware semaphore, at least while the synchronization mutex remains acquired.

18 Claims, 13 Drawing Sheets

(56) References Cited

U.S. PATENT DOCUMENTS

| | | | | |
|---|---|---|---|---|
| 2004/0039884 | A1* | 2/2004 | Li | G06F 9/52 711/158 |
| 2006/0132491 | A1* | 6/2006 | Riach | G09G 5/363 345/505 |
| 2008/0005741 | A1* | 1/2008 | Terrell | G06F 9/526 718/102 |
| 2012/0054394 | A1* | 3/2012 | Namjoshi | G06F 9/526 710/200 |
| 2014/0281086 | A1 | 9/2014 | Bacigalupo et al. | |
| 2021/0263876 | A1 | 8/2021 | Dekens | |

OTHER PUBLICATIONS

Kinniment, "Synchronization and Arbitration in Digital Systems," Chapter 3, Section 6, "The MUTEX," and Chapter 12, "Simple Two-way Arbiters," Copyright © 2007, John Wiley & Sons Ltd, 25 pages.

IPO Search Report under Section 17 for Great Britain Application No. 2304343.3, dated Oct. 19, 2023, 4 pages.

* cited by examiner

INTEGRATED CIRCUIT WITH HARDWARE SEMAPHORE

CROSS REFERENCE TO RELATED APPLICATION

This application claims priority from Great Britain Application No. 2304343.3, filed Mar. 24, 2023, which application is incorporated herein by reference in its entirety.

TECHNICAL FIELD

This invention relates to a hardware semaphore and associated circuitry in an integrated circuit.

BACKGROUND OF THE INVENTION

Concurrent processes on an integrated circuit may require access to a shared resource, such as a shared region of memory or even a shared microcontroller, at points in their respective operations, or it may be desirable for other reasons for a process to wait for one or more other processes to complete certain tasks or arrive at certain points in their processing. The processes may include software processes and/or hardware processes.

For example, two peripherals on a system-on-chip (SoC) may exchange data at a shared location in RAM: the first peripheral (e.g. an encryption engine) may read data from a shared memory to which the second peripheral (e.g. a serial interface) writes the data. Unless the processes are completely synchronized, the first process could attempt to read data from the shared memory before the second process has written the data to the memory, or at the same time as the second process is writing the data. This can lead to errors.

One method of arbitrating access to a shared resource uses a semaphore. This is a shared variable whose value can be read and/or changed by any of multiple processes. The semaphore may store a single binary value (i.e. a flag) or a multi-bit value. In one example, rules can be implemented wherein each process must wait for the semaphore to be zero before it enters a critical section, during which it can access the shared resource. Then, upon entering its critical section, the process increments the semaphore. It decrements the semaphore when it exits the critical section. This approach may be used so that only one process can enter the critical section at a time.

Semaphores can also be used to synchronize processes whereby one process waits for the other processes to reach particular points in their processing. For example, a semaphore may be initialized to zero before N processes are initiated. At the point where the N processes need to be synchronized, they each increment the semaphore by one and wait to read the semaphore as N before proceeding. The semaphore will be N only when all processes have reached the synchronization stage. Upon observing value N, each process can each decrement the semaphore by one and continue. In this way the same semaphore can be used repeatedly to synchronize the processes at various points.

However, in both those examples, it is possible that two or more processes may attempt to change the semaphore simultaneously such that one process might potentially over-write a change by the other process. This problem may be particularly acute when the processes are completely asynchronous to each other—e.g. with one or more of the processes being un-clocked (e.g. implemented with asynchronous logic circuitry), or with the processes being synchronous circuits but located in different clock domains, i.e. being clocked by different clocks. It is not straightforward to address this problem.

Embodiments of the present invention seek to provide improved ways of arbitrating access to a hardware semaphore.

SUMMARY OF THE INVENTION

From a first aspect, the invention provides an integrated circuit comprising:

- a hardware semaphore configured to store a value; and
- asynchronous hardware logic circuitry for operating the hardware semaphore, wherein the asynchronous hardware logic circuitry comprises:
- a hardware synchronization mutex, switchable between any of one or more acquired states and an unacquired state; and
- a first input for receiving requests to change the value of the hardware semaphore;

and wherein the asynchronous hardware logic circuitry is configured, in response to receiving a request to change the value of the hardware semaphore at the first input,

- if the synchronization mutex is in the unacquired state:
  - to switch the synchronization mutex to a first acquired state;
  - then to change the value of the hardware semaphore in response to the request; and
  - then to switch the synchronization mutex to the unacquired state, and
- if the synchronization mutex is in an acquired state, not to change the value of the hardware semaphore in response to the request, at least while the synchronization mutex remains in the acquired state.

Thus it will be seen that, in accordance with embodiments of the invention, operation of a semaphore is provided using a mutex (i.e. a hardware mutual exclusion element) within an asynchronous (i.e. un-clocked) hardware logic circuit that receives requests to change the semaphore.

Switching the synchronization mutex into an acquired state before changing the value of the hardware semaphore, and not releasing the synchronization mutex back to the unacquired state until after the value of the hardware semaphore has changed, can be used to ensure that more than one request to change the value of the hardware semaphore is not granted at the same time. If a request to change the value of the hardware semaphore is received while the hardware semaphore is already being changed, this request will not be granted, at least until the synchronization mutex has been released to the unacquired state.

This avoids leaving a small window of time where multiple processes might read the semaphore variable and race to change it.

This approach, based on asynchronous logic, can reliably arbitrate between processes even when the processes are completely asynchronous, thereby ensuring the integrity of the semaphore variable even in such situations. Moreover, at least some embodiments may be faster and/or use less power than traditional implementations of mutual-exclusion arbiters and semaphores. In particular, the use of asynchronous hardware logic as disclosed herein may avoid the need to send interrupts to processors in order to arbitrate access to a semaphore.

The first input may be a single hardware line. It may be coupled to a source on the integrated circuit. The asynchronous hardware logic circuitry may be configured to receive requests to change the value of the hardware semaphore from any of a plurality of sources (e.g. from a plurality of processes). The asynchronous hardware logic circuitry may comprise a plurality of inputs (e.g. a plurality of change-request input lines), including the first input, for receiving requests to change the value of the hardware semaphore from any of the plurality of sources. Each source may be integrated on the integrated circuit and may comprise respective electronic circuitry (e.g. sequential logic circuitry). The integrated circuit may be configured to generate the requests to change the value of the hardware semaphore. Each request may be generated by a hardware process or by a software process. Each change-request input may be coupled to a respective source on the integrated circuit (i.e. outside the asynchronous hardware logic circuitry). Each source may comprise a processor and/or application-specific hardware circuitry. Two or more of the plurality of change-request inputs may be coupled to a same source, or each of the plurality of change-request inputs may be coupled to a different respective source. Each of the change-request sources may be un-clocked or may be clocked by a different clock from any of the other change-request sources.

The asynchronous nature of the hardware logic circuitry advantageously enables it to be used to arbitrate access to the hardware semaphore by processes that are not otherwise synchronized, e.g. because they are in different clock domains, or because one or more of the processes is un-clocked. Thus, in some embodiments, at least one of the plurality of sources comprises asynchronous (i.e. un-clocked) circuitry. In some embodiments, the plurality of sources includes a first source in a first clock domain and a second source in a second clock domain, wherein the first clock domain is different from the second clock domain. The first and second clock domains may be independently clocked—e.g. at different clock frequencies and/or by different oscillators.

The asynchronous hardware logic circuitry may comprise logic for detecting that the synchronization mutex is in the first acquired state before changing the value of the hardware semaphore in response to the request. The asynchronous hardware logic circuitry may comprise logic for verifying that the value of the hardware semaphore has been changed, in response to the request, before switching the synchronization mutex to the unacquired state.

The synchronization mutex may comprise a plurality of mutex-request inputs (e.g. two or three mutex-request input lines), each arranged for receiving a respective request to switch to a respective acquired state (also referred to herein as acquiring the mutex). The synchronization mutex may comprise a corresponding plurality of mutex-grant outputs (e.g. two or three mutex-grant output lines). Each mutex-request input may have an associated mutex-grant output. Each mutex-request input and mutex-grant output may comprise a single line implemented in hardware which is configured to be switched between a high state and a low state (i.e. set to 1 or 0), also referred to herein as being asserted and de-asserted, respectively. A high state of a request input line may correspond to a request to acquire the synchronization mutex. A high state of a grant output line may correspond to the synchronization mutex being successfully acquired by the corresponding request input. The synchronization mutex may be configured such that only one of the mutex-grant output lines can be set to a high state at one time, i.e. such that the grant outputs are mutually exclusive. Consequently, the mutex may only be acquired by one request input at any time. If one of the grant output lines of the synchronization mutex is set to a high state, the mutex can be said to be in an acquired state associated with that grant output line. If none of the grant output lines are set to a high state, the synchronization mutex can be said to be in the unacquired state.

The synchronization mutex may be configured, when in the unacquired state, to switch to an acquired state in response to a first-received request at any of the plurality of mutex-request inputs. It may be configured to indicate at which mutex-request input the first-received request was received, e.g. by asserting a corresponding one of the plurality of mutex-grant outputs. The synchronization mutex may be configured to remain in the corresponding acquired state for as long as the first-received request is maintained—i.e. at least until the mutex-request input at which the first-received request was received is de-asserted. It may be configured to switch to the unacquired state (also referred herein as being released) in response to a cessation of the first-received request—i.e. to the corresponding mutex-request input being de-asserted. In some embodiments, the synchronization mutex may be able to switch directly from a first acquired state to a second acquired state, e.g. if a second mutex-request input is already asserted when a first mutex-request input is de-asserted. For the purposes of the present disclosure, the synchronization mutex may still be regarded as passing through the unacquired state, albeit only momentarily or notionally, in such situations.

The synchronization mutex may comprise n mutex-request inputs and n mutex-grant outputs, and be configured to provide mutual exclusion between up to n requests to acquire the synchronization mutex, where n=2, 3 or more. Where n>2, the synchronization mutex may comprise a plurality of electrically coupled mutex circuit elements, each mutex circuit element having two request inputs and two grant outputs.

The asynchronous hardware logic circuitry may comprise an output for indicating whether the synchronization mutex is in an acquired state. The output may indicate whether the synchronization mutex is any acquired state (i.e. irrespective of which input the granted request was received on), or the output may indicate whether the synchronization mutex is in one particular acquired state (i.e. acquired by a particular mutex-request input). In either case, such an output may enable one or more processes to check the state of the synchronization mutex directly, which may be useful in various situations. In some embodiments, the output may be used to grant permission to a process to read the hardware semaphore. In some embodiments, the output may be used to grant permission to a process to change the value of the hardware semaphore directly, i.e. rather than requesting the change by made by the asynchronous hardware logic circuitry.

In some embodiments, the asynchronous hardware logic circuitry comprises an input (e.g. a read-request input line) for receiving requests to read the value of the hardware semaphore. This input may be coupled to a source on the integrated circuit. This source may also be coupled to an input for requesting to change the value of the hardware semaphore (i.e. the read-request source may also be a change-request source); however, this need not necessarily be the case, and it may be desirable in some situations for a process to be able to read the semaphore without being able to change the semaphore. The asynchronous hardware logic circuitry may be configured, in response to receiving a request to read the value of the hardware semaphore, if the synchronization mutex is in the unacquired state, to switch the synchronization mutex to an acquired state and to output (e.g. to the source) an indication that the mutex is in the acquired state. The asynchronous hardware logic circuitry may be configured to switch the synchronization mutex from the acquired state to the unacquired state in response to a cessation of the request to read the value of the hardware semaphore (e.g. in response to a de-assertion of the read-request input line).

Advantageously, switching the synchronization mutex to an acquired state in response to the request to read the value of the hardware semaphore can prevent a later request to change the value of the hardware semaphore from being granted while the hardware semaphore is still being read. This may avoid an unstable semaphore value from being read, which could otherwise lead to errors.

This is beneficial even where only a single write action and a single read action are requested, but it may be particularly beneficial in situations where a process needs to read the value of the hardware semaphore multiple times in succession, without the value changing during the reads. In such situations, the read process (e.g. a software process) may acquire the synchronization mutex, then perform a succession of reads of the hardware semaphore, before switching the synchronization mutex to the unacquired state (e.g. by de-asserting the request to read the value of the hardware semaphore). It may also be useful where the read action is performed by hardware, and the value of the hardware semaphore is output to two or more different destinations via different respective hardware output lines. Each hardware output line may input to a different respective logic gate, which in turn may generate an output that depends on the value of the hardware semaphore. In this scenario, when the semaphore value changes, it is possible that the different logic gates receive different values of the semaphore due to slight variations, e.g. in wire lengths or gate delays. This could result in differing outputs from logic gates that should always be the same. Avoiding the value of the semaphore changing at the same time as it is being read can mitigate this problem. For instance, the read process (e.g. a hardware process) may acquire the synchronization mutex, then read the output of any logic which is dependent on the value of the hardware semaphore, before switching the synchronization mutex to the unacquired state (e.g. by de-asserting the request to read the value of the hardware semaphore).

In some embodiments, the asynchronous hardware logic circuitry may be configured to receive requests to read the value of the hardware semaphore from any of a plurality of sources (e.g. respective processes). It may comprise a plurality of read-request inputs (e.g. a plurality of read-request input lines) for receiving requests to read the value of the hardware semaphore from any of the plurality of sources. Each of the inputs may be coupled to a respective source on the integrated circuit (i.e. outside the asynchronous hardware logic circuitry). Two or more of the plurality of read-request inputs may be coupled to a same source, or each of the plurality of read-request inputs may be coupled to a different respective source. Each of the read-request sources may be un-clocked or may be clocked by a different clock from any of the other read-request sources.

In some embodiments, each input for receiving a request to change the value of the hardware semaphore, and, if present, each input for receiving a request to read the value of a semaphore, comprises a respective single hardware line. The hardware line may be configured to be switched between an asserted state (e.g. a logic high voltage level) and an unasserted state (e.g. a logic low voltage level). For example, a process outside of the asynchronous hardware logic circuitry which requests to change or read the value of the semaphore may switch an input for receiving a request to change or to read the value of the hardware semaphore to an asserted state. The asserted state may correspond to a "high" value, i.e. one, on the hardware input line, and an unasserted state may correspond to a "low" value, i.e. zero, on the hardware input line. A de-assertion of the hardware input line may correspond to a cessation of a request to access the hardware semaphore.

In some embodiments, if the synchronization mutex is in an acquired state (i.e. it is not in the unacquired state) when the request to change the value of the hardware semaphore is received at the first input, the request may be discarded.

However, in some embodiments, the asynchronous hardware logic circuitry is configured, in response to receiving the request to change the value of the hardware semaphore at the first input, if the synchronization mutex is in an acquired state:

- to wait until the synchronization mutex is no longer in the acquired state;
- then to switch the synchronization mutex to the first acquired state;
- then to change the value of the hardware semaphore in response to the request; and
- then to switch the synchronization mutex to the unacquired state.

In this situation, the acquired state that the synchronization mutex is in when the request is received may be an acquired state other than the first acquired state (i.e. with the mutex already acquired by some process other than the source of the present request). Thus, a request that is received while the synchronization mutex is already in an acquired state may be held and later carried out by the asynchronous hardware logic circuitry once the synchronization mutex has been released by whatever process has acquired it. The asynchronous hardware logic circuitry may be configured to receive the request as a pulse at the first input, which may cease before the value of the hardware semaphore is changed. Thus, a requesting process coupled to the first input line may request to change the value of the hardware semaphore by sending a pulse, instead of having to continuously assert the first input while the asynchronous hardware logic circuitry changes the value of the hardware semaphore. In other words, the process may assert a line to the first input and then de-assert the line before the synchronization mutex has been released, with the asynchronous hardware logic circuitry then implementing the requested change. This can allow the requesting process to continue performing other operations after requesting the change to the semaphore, rather than being stalled.

This holding of a request (e.g. a pulsed request) may be implemented in any appropriate way. In some embodiments the asynchronous hardware logic circuitry may comprise a latch (e.g. within an asynchronous wait block), and may be configured to set the latch in response to receiving a request to change the value of the hardware semaphore at the first input, or in response to receiving a request to read the value of the hardware semaphore at a further input. It may be configured to latch every request received at the first input, or at the further input. The asynchronous hardware logic circuitry may comprise sampling logic for sampling the latch to detect the request. The sampling logic may be configured to wait until the hardware semaphore has been changed in response to a preceding request before sampling the latch. The asynchronous hardware logic circuitry may be configured to sample the latch to detect the request before switching the synchronization mutex to the first acquired state.

In some embodiments, the asynchronous hardware logic circuitry may be configured, for at least some requests to change or read the value of the hardware semaphore, to switch the synchronization mutex to the unacquired state as soon as the value of the hardware semaphore has been changed. This may advantageously ensure that the synchronization mutex is released as soon as possible, enabling other requests to change or read the value of the semaphore to be granted.

However, in some embodiments, the asynchronous hardware logic circuitry may be configured, for at least some requests to change or read the value of hardware semaphore, to switch the synchronization mutex to the unacquired state in response to a cessation (e.g. de-assertion) of the request to change or read the value of the hardware semaphore that caused the synchronization mutex to be switched to an acquired state. The request to change or read the value of the hardware semaphore may be asserted and then subsequently de-asserted on a single hardware input line. This may be useful when, for example, in some embodiments, a process that is arranged to request to change the value of the hardware semaphore needs to check that the value of the hardware semaphore has been changed before any other process accesses the hardware semaphore. In such embodiments, the asynchronous hardware logic circuitry may be configured such that, after the synchronization mutex has been acquired by a requesting process for changing the hardware semaphore value, the requesting process controls when the synchronization mutex is released back to the unacquired state; it may be arranged to do so only once the process has read the semaphore value and verified that the requested change has been implemented.

In some embodiments, the asynchronous hardware logic circuitry is configured, in response to receiving a request to change the value of the hardware semaphore (e.g. at the first input or a further input), if the synchronization mutex is in the unacquired state:

- to switch the synchronization mutex to the first acquired state;
- then to change the value of the hardware semaphore in response to the request; and
- then, in response to a cessation of the request to change the value of the hardware semaphore, to switch the synchronization mutex to the unacquired state.

In some embodiments, the asynchronous hardware logic circuitry is configured, in response to a cessation of a request to read the value of the hardware semaphore, to switch the synchronization mutex to the unacquired state. In such embodiments, it may be impossible for any other process to change the hardware semaphore until the request to read the value of the hardware semaphore has ceased (e.g. is de-asserted). This may allow the process which made (e.g. asserted) the request to perform one or more further operations, in addition to reading the value of the hardware semaphore, before causing the releasing the synchronization mutex.

In some embodiments, the request to change the value of the hardware semaphore, received at the first input, may be a request to increment (e.g. set) the value of the hardware semaphore. The asynchronous hardware logic circuitry may be configured to increment the value of the hardware semaphore in response to the request. The first input may be arranged only to receive requests to increment the value of the hardware semaphore. The asynchronous hardware logic circuitry may comprise a second input, for receiving requests to decrement (e.g. clear) the value of the hardware semaphore. The asynchronous hardware logic circuitry may be configured, in response to receiving a request to decrement the value of the hardware semaphore at the second input, if the synchronization mutex is in the unacquired state: to switch the synchronization mutex to an acquired state (e.g. the first acquired state); then to decrement the value of the hardware semaphore in response to the request; and then to switch the synchronization mutex to the unacquired state, and, if the synchronization mutex is in an acquired state, not to decrement the value of the hardware semaphore in response to the request, at least while the synchronization mutex remains in the acquired state. The second input may be arranged only to receive requests to decrement the value of the hardware semaphore.

In a first set of embodiments, the value stored by the hardware semaphore is a single bit. The hardware semaphore may be switchable between two states: a first state storing a value of zero and a second state storing a value of one. In such embodiments, a request to increment the value of the hardware semaphore may correspond to a request to set the hardware semaphore, i.e. to switch the value to one, and a request to decrement the value of the hardware semaphore may correspond to a request to clear the hardware semaphore, i.e. to switch the value to zero. In such embodiments, the hardware semaphore may comprise a Muller C-element. The Muller C-element may comprise two or more inputs and may be configured to output a low state (i.e. representing a value of zero) when all the inputs are low, and to output a high state (i.e. representing a value of one) when all the inputs are high; it may be configured to maintain a current output state otherwise.

In a second set of embodiments, the hardware semaphore is configured to store a multi-bit value. The hardware semaphore may be configured to be switchable between a set of at least four different states corresponding to four different binary values. For example, the hardware semaphore may store a two-bit value and be switchable between four states (corresponding to the binary values $00_2$, $01_2$, $10_2$ and $11_2$). The asynchronous hardware logic circuitry may be configured to increment and/or decrement the hardware semaphore and/or to set it to a requested value (e.g. to a requested value of zero).

In some embodiments, the asynchronous hardware logic circuitry comprises access control circuitry, separate from the synchronization mutex, for controlling access to the synchronization mutex and/or the hardware semaphore. The access control circuitry may comprise a mutex-request output that is coupled to a first mutex-request input of the synchronization mutex. The access control circuitry may be configured to use the mutex-request output to switch the synchronization mutex to the first acquired state in response to the request to change the value of the hardware semaphore received at the first input. It may be configured to latch the request before sending a signal on the mutex-request output. The synchronization mutex may comprise a first mutex-grant output corresponding to the first mutex-request input, which may be coupled to the access control circuitry for use by the access control circuitry in determining when to change the value of the hardware semaphore in response to the request.

In some embodiments with such access control circuitry, the asynchronous hardware logic circuitry may further comprise a second input for receiving requests to change the value of the hardware semaphore, and is configured to pass requests received at the second input directly to a second mutex-request input of the synchronization mutex (i.e. without passing through the access control circuitry and without being latched). The synchronization mutex may comprise a second mutex-grant output corresponding to the second mutex-request input, which may be coupled to the access control circuitry for use by the access control circuitry in determining when to change the value of the hardware semaphore in response to the request. In such embodiments, the access control circuitry does not need to perform the steps of switching the synchronization mutex to an acquired state, and subsequently releasing the synchronization mutex. Instead, the synchronization mutex may, in some embodiments, be switched to the unacquired state in response to a ceasing (e.g. de-assertion) of the request at the second input.

The asynchronous hardware logic circuitry may comprise one or more inputs for receiving requests to set the value of the hardware semaphore, and a further input for receiving a request to clear the value of the hardware semaphore. Access control circuitry within the asynchronous hardware logic circuitry may be configured to switch the synchronization mutex to the unacquired state after changing the semaphore value in response to a request to set the hardware semaphore, but not to switch the synchronization mutex to the unacquired state after changing the semaphore value in response to a request to clear the hardware semaphore. Instead, this may happen when the request to clear the hardware semaphore is de-asserted. This may be useful where stronger hardware protection of the set operation is required, e.g. because any of a plurality of processes are able to set the semaphore, but only one process is able to clear the semaphore.

The synchronization mutex may comprise a bistable and a metastability filter. The bistable may comprise a pair of cross-coupled logic gates. The metastability filter may be configured to prevent the mutex from output a metastable level. The metastability filter may be configured to signal when a change of state has occurred. The synchronization mutex may be configured to indicate which of a plurality of inputs has acquired the mutex when the mutex is switched to an acquired state.

The integrated circuit may be all or a portion of a semiconductor chip. It may be a system-on-chip (SoC). It may comprise one or more processors for executing software instructions. It may comprise memory (e.g. RAM and/or non-volatile memory), which may be arranged to stored software for execution by the one or more processors. It may comprise clock management circuitry for managing one or more clock domains. It may comprise one or more peripherals, such as an interface controller (e.g. a Serial Peripheral Interface or USB controller), a digital-to-analog converter (DAC), an analog-to-digital converter (ADC), a timer, a hardware cryptographic engine, a digital radio module, and/or any other types of peripheral.

Each of the processes disclosed herein may be a software process (e.g. performed by a processor of the integrated circuit), or may be a hardware process (e.g. performed by a peripheral of the integrated circuit).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
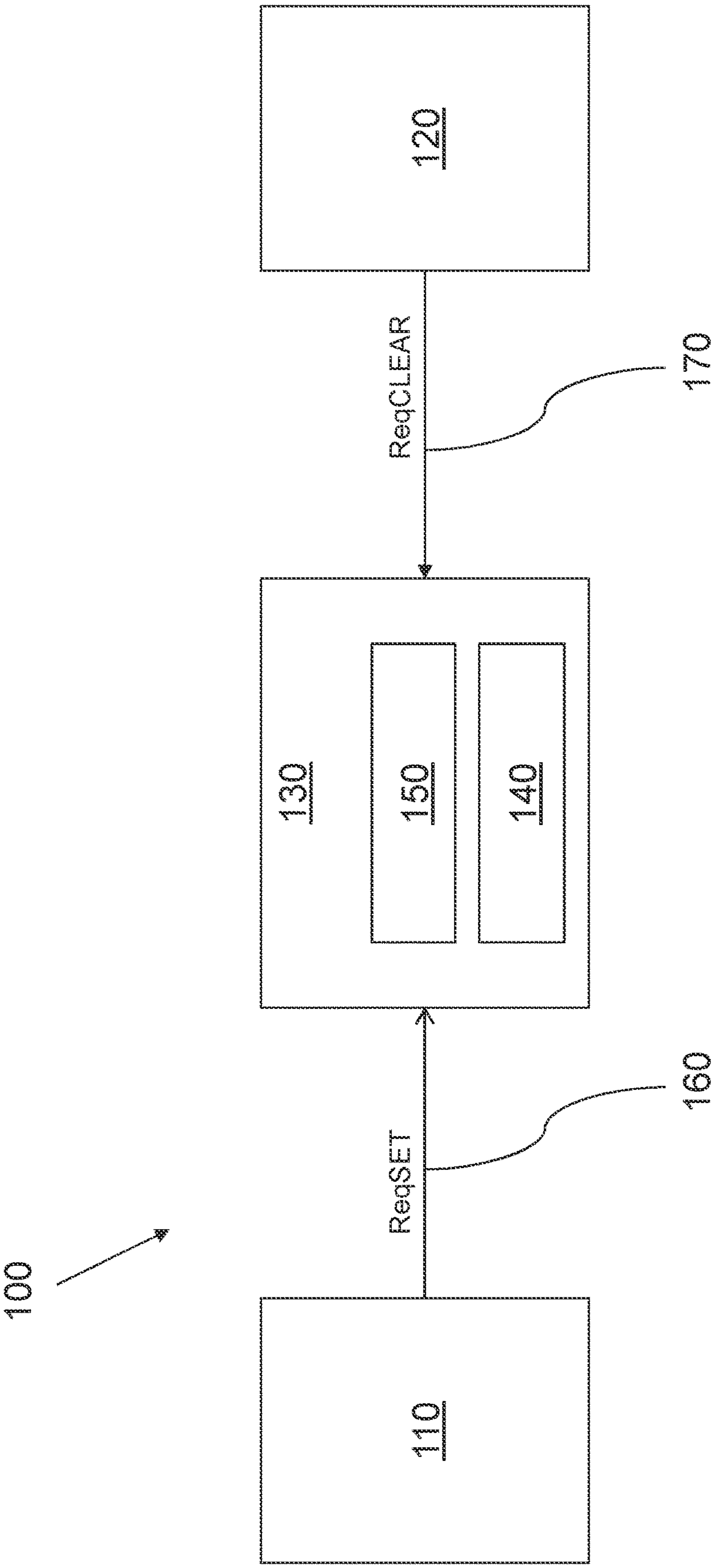
FIG. 1 is a schematic diagram of an integrated circuit (IC) implemented in accordance with a first embodiment of the invention.

FIG. 1 is a schematic diagram of a portion of an integrated circuit (IC) 100 implemented in accordance with a first embodiment of the invention. In this first embodiment, a first process 110 and a second process 120 are coupled to a semaphore module 130. The processes 110 and 120 may be clocked or un-clocked processes. They may both be clocked by the same clock, but this is not required and in some embodiments they are in different clock domains, clocked by independent clocks. Each process 110, 120 may be a software process (i.e. executing on a respective processor) or a hardware process (e.g. implemented by application-specific digital logic circuitry). The semaphore module 130 comprises a hardware semaphore 140 (embodying the hardware semaphore disclosed above) and asynchronous hardware logic circuitry for arbitrating access to the hardware semaphore 140. This asynchronous hardware logic circuitry includes, among other components, a synchronization mutex 150 that can be switched between any of one or more acquired states and an unacquired state. The first process 110 is connected to the semaphore module 130 by a first single-bit hardware line 160, and the second process 120 is connected to the semaphore module 130 by a second single-bit hardware line 170.

In one example, the first process 110 operates in a first clock domain and the second process 120 operates in a second independent clock domain. In this first embodiment, the hardware semaphore 140 stores a single-bit value, and the first process 110 is, at some point in its operation, required to set the hardware semaphore 140 by changing its value to one (i.e. logic high). The second process 120 is, at some point in its operating program, required to clear the hardware semaphore by changing the value of the hardware semaphore to zero (i.e. logic low). However, the timing of these requests cannot be straightforwardly coordinated, especially as the processes 110 and 120 operate in different clock domains. As a result, it is possible that the first process 110 and the second process 120 may try to request to set or clear the hardware semaphore 140 at almost exactly the same time.

The first process 110 can request to set the hardware semaphore 140 by setting the hardware line 160 to a high state, indicating an asserted request to set the semaphore, ReqSET. The second process 120 can request to clear the hardware semaphore by setting the hardware line 170 to a high state, indicating an asserted request to clear the semaphore, ReqCLEAR. The semaphore module 130 ensures that only one of these requests on hardware lines 160 and 170 can be granted at any one time, by using the synchronization mutex 150 to protect the hardware semaphore 140.

Figure 2:
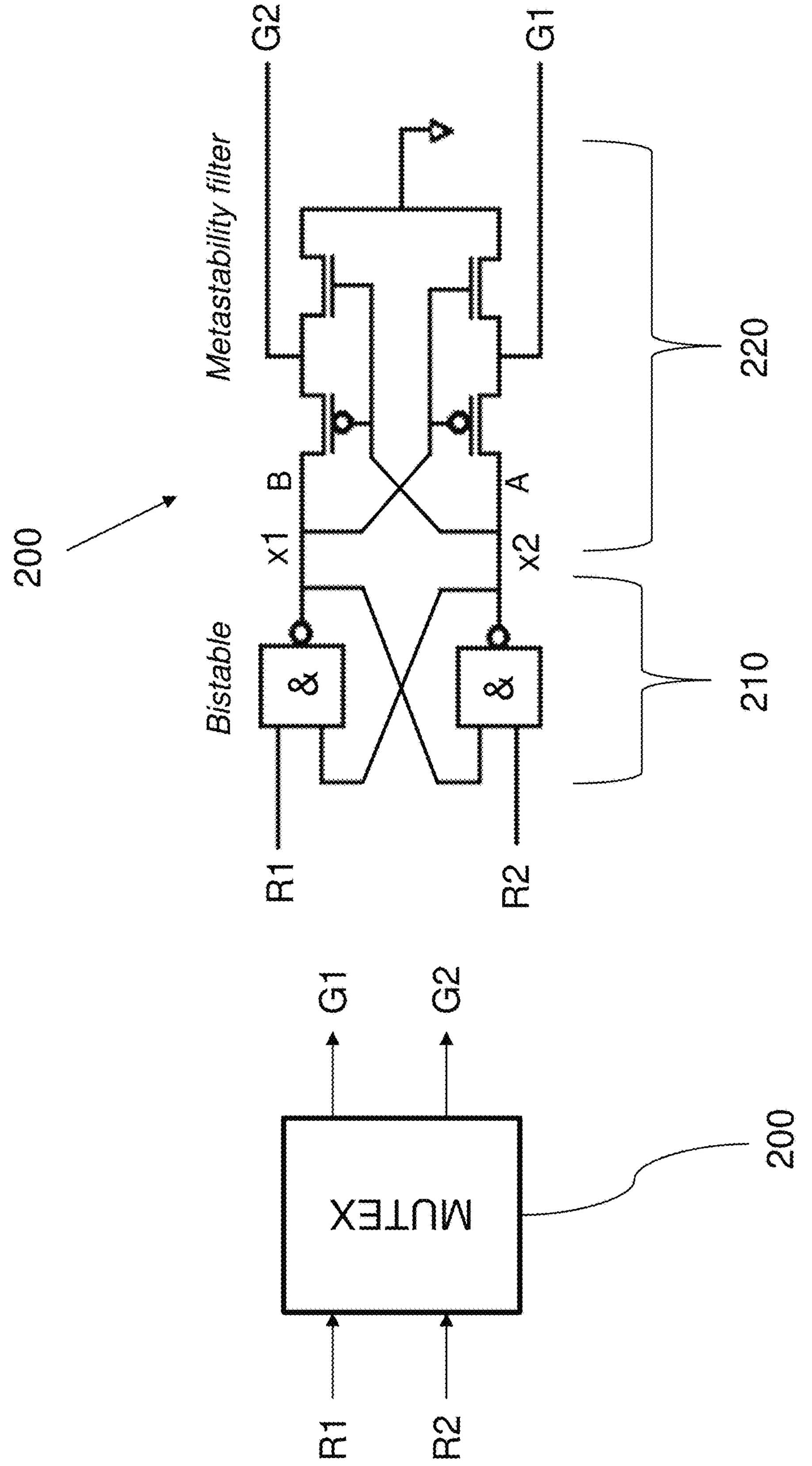
FIG. 2 shows schematic and circuit diagrams of a conventional mutex element used to implement the synchronization mutex in the semaphore module of FIG. 1.

FIG. 2 shows an example of a conventional mutex element 200 that may be used to implement the synchronization mutex 150 in the semaphore module 130. The left side shows a high-level schematic representation, while the right side shows a circuit level implementation. The mutex element 200 has two request input lines (labelled as R1 and R2), as well as two grant output lines (labelled as G1 and G2). The request input R1 corresponds to the grant output G1, and the request input R2 corresponds to the grant output line G2. The mutex element 200 ensures mutual exclusion between granting requests from the two inputs using a bistable 210 and a metastability filer 220. In operation, if a request to acquire the mutex element 200 has been asserted on a first one of the input lines, e.g. R1, the corresponding grant output line, e.g. G1, is set to a high state. This operation switches the mutex element 200 to an acquired state (e.g. a first acquired state if R1 is asserted, or a second acquired state if R2 is asserted), and the process that set the input high is said to have acquired the mutex. If a request to acquire the mutex element is then received on the other input line, e.g. R2, the mutex element 200 remains acquired by the request on the first input line, e.g. R1. Once the request on the first input line, e.g. R1, is de-asserted, i.e. set to a low state, the mutex element 200 switches to an unacquired state, and is said to have been released. It is then available to be requested again by a request on either request input line R1 or R2. The metastability filer 220 ensures that no metastable levels are output by the mutex element 200.

In some situations, one input line (e.g. R2) may be asserted while the other input line (e.g. R1) is already asserted and the corresponding grant output line (e.g. G1) is set to a high state. In this case, when the input line (e.g. R1) that has acquired the mutex element 200 is de-asserted, the mutex element 200 may subsequently indicate that the request at R2 is granted by setting the output line G2 to a high state. To achieve this, the mutex element 200 might set G1 to a low state then, after a short interval, raise G2 to a high state, or it might raise G2 to a high state then, after a short interval, lower G1 to a low state. The width of this time interval can be so small (femtoseconds or attoseconds) that it appears that G1 and G2 exchange states at the same time, or it may be large enough that it is observable (i.e. of the order of picoseconds or nanoseconds). In all cases, the mutex element 200 can be considered to pass through an unassigned state, at least momentarily, when switching from a first acquired state to a second acquired state.

The precise operation of the mutex element 200 may depend on a plurality of factors including the voltage, temperature and also on the physical implementation of the mutex element 200 and the load on the outputs G1 and G2.

Figure 3:
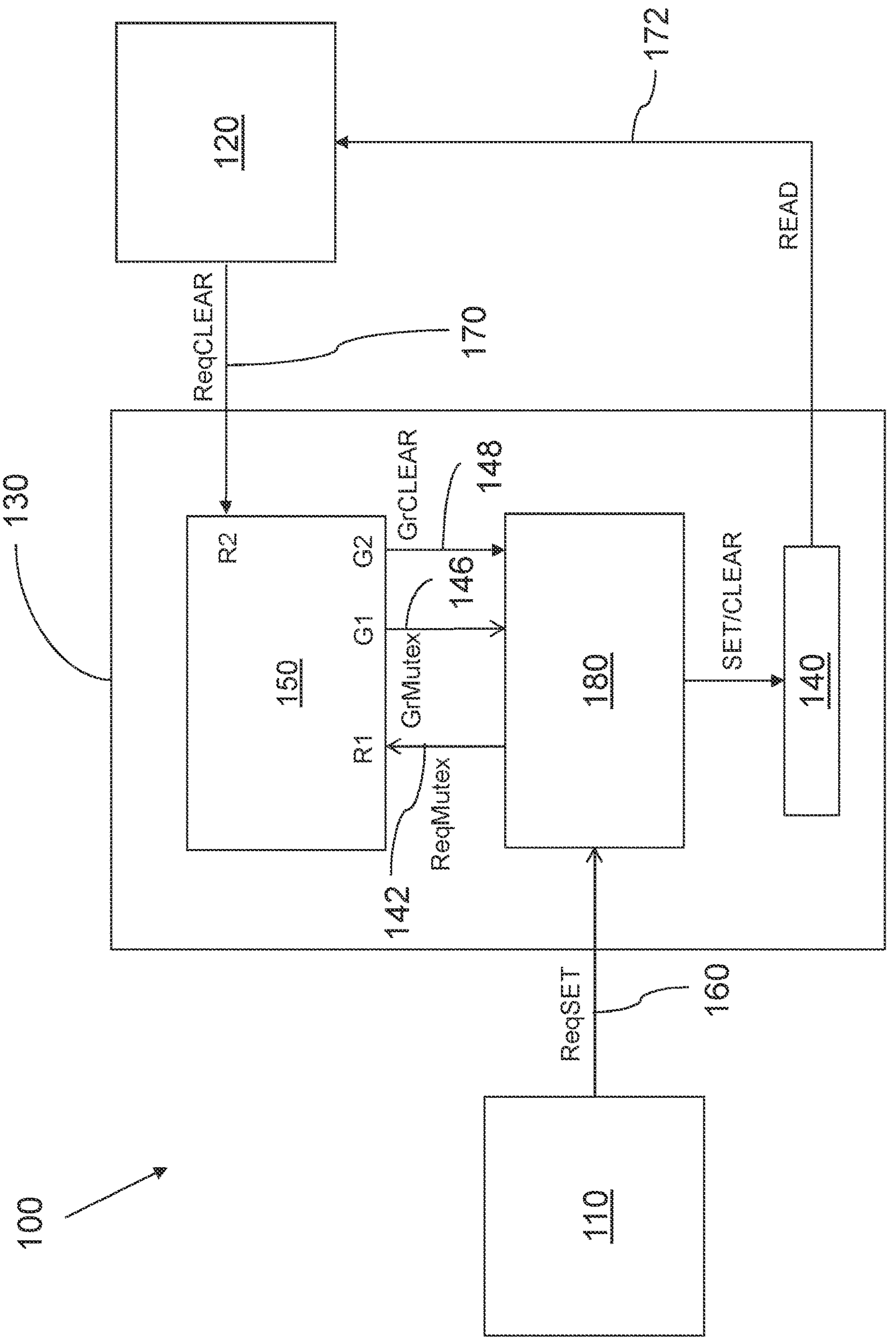
FIG. 3 is a schematic diagram showing the semaphore module of FIG. 1 in more detail.

FIG. 3 is a schematic diagram of the IC 100 showing more detail of the semaphore module 130. The semaphore module 130 comprises the hardware semaphore 140 and the synchronization mutex 150 as shown in FIG. 1, as well as access control logic 180 (which may form a further part of the asynchronous hardware logic circuitry as disclosed herein). The second process 120 is connected to the semaphore module 130 via the hardware logic line 170 for requesting to clear the hardware semaphore 140, as previously shown in FIG. 1, and is also here connected to the semaphore module 130 by a value-output line 172 for reading the value output by the hardware semaphore 140.

The synchronization mutex 150 has an R1 request line 142 and an R2 request line 170, as well as a G1 grant output line 146 and a G2 grant output line 148. It may be a mutex element 200 as shown in FIG. 2. The R2 request input line 170 is configured to receive a signal ReqCLEAR from the second process 120 requesting to clear the value of the hardware semaphore 140. The access control logic 180 is configured to receive a signal GrCLEAR from the grant output line 148 to indicate when the value of the hardware semaphore 140 should be cleared. The R1 request input line 142 is configured to receive a signal ReqMutex from the access control logic 180 to request acquisition of the synchronization mutex 150. The access control logic 180 is configured to receive an signal GrMutex (i.e. "mutex granted") from the G1 grant output line 146 to indicate when the synchronization mutex 150 has been successfully acquired.

When the second process 120 requests to clear the hardware semaphore 140 by asserting the ReqCLEAR signal, this is sent over the R2 request input line 170 to the synchronization mutex 150. This input thus requests to acquire the synchronization mutex 150. If the synchronization mutex 150 hasn't already been acquired by the first process 110, the synchronization mutex 150 sets the grant output line 148 (G2) to a high state, sending the GrCLEAR signal to the access control logic 180. In response to receiving this input, the access control logic 180 clears the value of the hardware semaphore 140, i.e. sets the value of the hardware semaphore 140 to zero. When the value of the hardware semaphore 140 has been updated, the second process 120 can detect that value of the hardware semaphore 140 has been changed, by sensing a change on the value-output line 172. If the second process 120 is a hardware process, the change of the value-output line 172 may be arranged to provide an input to the hardware process that directly triggers the read operation. If the second process 120 is a software process (i.e. being executed on a processor), the second process 120 may sense the change on the value-output line 172 by polling the value-output line 172 at intervals, or the semaphore module 130 may be configured to send an interrupt request (IRQ) to the processor when the value-output line 172 changes. For example, the value-output line 172 may be configured to send an interrupt request when the semaphore value attains a predetermined value (e.g. zero or five). The second process 120 then switches the R2 request input line 170 to a low state to release the synchronization mutex 150. By releasing the synchronization mutex, the grant output line 148 (G2) is also switched to a low state. This leaves the synchronization mutex 150 in the unacquired state.

Thus, for the ReqCLEAR request, to clear the value of the hardware semaphore 140, the second process 120 directly handles the acquisition and release of the process-synchronization mutex 150. This type of request is referred to herein as a "blocking" request, because the process synchronization mutex 150 remains in an acquired state until the second process 120 releases it, with the second process 120 potentially being blocked from moving on to other tasks until the semaphore change process has completed.

The first process 110, by contrast, submits what are referred to herein as "non-blocking" requests to the semaphore module 130, because the first process 110 may be free to perform other tasks once it has issued the request, because the semaphore module 130 is configured to release the process synchronization mutex 150 automatically after the hardware semaphore 140 has been set.

When the first process 110 requests to set the hardware semaphore 140, by asserting the ReqSET signal, this request is passed straight to the access control logic 180 via the hardware line 160. The access control logic 180 is configured then to request the synchronization mutex 150, via the R1 request input line 142. If the synchronization mutex 150 hasn't already been acquired by a different process, the synchronization mutex 150 sets the G1 grant output line 146 to a high state. In response to receiving this input, the access control logic 180 sets the value of the hardware semaphore 140 to one. When the value of the hardware semaphore 140 has been updated, the access control logic 180 switches the R1 request input line 142 to a low state to release the synchronization mutex 150. By releasing the synchronization mutex 150, the G1 grant output line 146 is switched to a low state. This leaves the synchronization mutex 150 in the unacquired state.

Thus, for the ReqSET request, the access control logic 180 handles the acquisition and release of the process-synchronization mutex 150. The ReqSET signal may be provided as a pulse, rather than a continuously-held assertion. This type of request is thus referred to herein as "non-blocking" because the first process 110 does not need to be blocked (i.e. stalled), by holding ReqSET (160) in a high state, until it has observed that the value of the hardware semaphore 140 is set. As a result, the process synchronization mutex 150 only remains in an acquired state for the time required to change the value of the hardware semaphore 140, and the first process 110 does not control when the synchronization mutex 150 is released.

Figure 4:
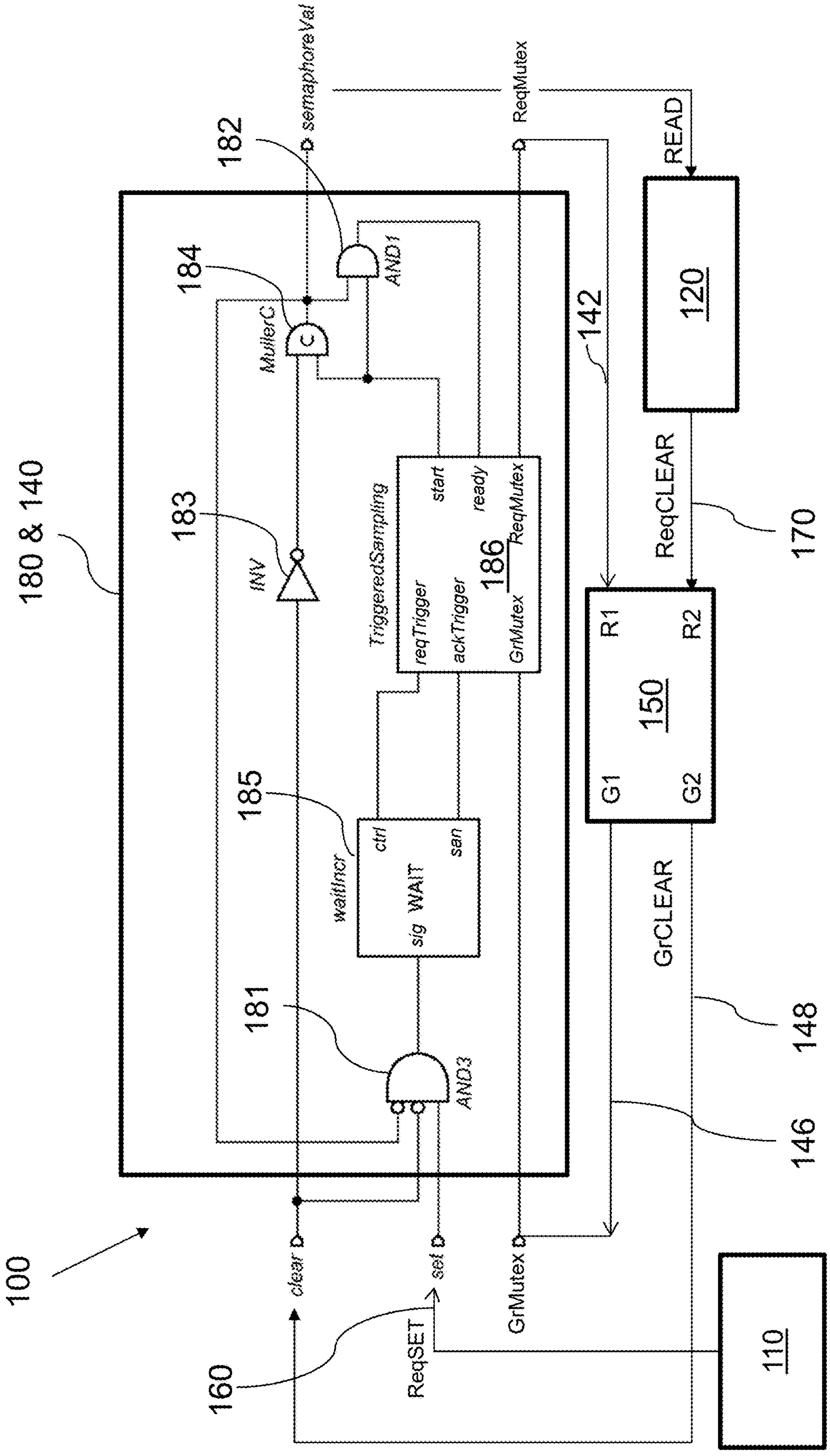
FIG. 4 is a schematic diagram with more detail of the access control logic of FIG. 3.

FIG. 4 shows a detailed exemplary hardware implementation of the access control logic 180. The connections between the access control logic 180 and the first process 110, the second process 120, the synchronization mutex 150 and the hardware semaphore 140 are configured as shown in FIG. 3.

The access control logic 180 in this example comprises two logic AND gates 181 and 182, an inverter 183, a Muller C-element 184, a WAIT block 185, and a TriggeredSampling control block 186. In this embodiment, the output of the Muller C-element 184 holds the value of the hardware semaphore 140 and can therefore be considered to implement the hardware semaphore 140. The Muller C-element 184 is configured such that, if both input lines are set to a high state, it switches its output line to a high state. If both input lines are set to a low state, it switches its output line to a low state. If the input lines are different to one another, the current state of the output line is maintained.

The TriggeredSampling control block 186 is configured to implement a sequence of logic operations which controls the acquisition and release of the synchronization mutex 150, as well as controlling setting the hardware semaphore 140, in response to the request ReqSET received from the first process 110.

The operation of the access control logic 180 in response to a ReqSET signal from the first process 110 is described in further detail below.

An asserted ReqSET signal, as described above in relation to FIG. 1 and FIG. 3, results in the hardware line 160 being set to a high state. The logic AND gate 181 grants this set request and sets its output to a high state if the value of the hardware semaphore 140 is not already set to one (i.e. if the semaphore 140 is not already set), and there is no granted clear request on the G2 grant output line 148. If the output of the AND gate 181 is high, the input sig of the WAIT block 185 is thus set to a high state.

The WAIT block 185 holds (e.g. latches) this asserted ReqSET signal until its input ctrl is set to a low state by the TriggeredSampling control block. When the ctrl input of the WAIT block is set to a high state, and the input sig is also set to a high state, the output san of the WAIT block is also set to a high state. This sets the ackTrigger input of the TriggeredSampling control block 186 to a high state, thereby indicating that a request to set the value of the hardware semaphore 140 has been received by the access control logic 180.

The TriggeredSampling block 186 is configured, in response to receiving an asserted input at ackTrigger, to set its output ReqMutex high. This signals a request ReqMutex to acquire the synchronization mutex 150 on the R1 request input line 142.

If the synchronization mutex 150 is unacquired (i.e. the second process 120 has not already acquired it), the G1 grant output line 146 is set high, and the GrMutex input of the TriggeredSampling block 186 is thus set high. The TriggeredSampling block is then configured, in response to its input GrMutex being set to a high state, to set its output start to a high state.

If the start output is set to a high state, and the GrCLEAR input on the G1 grant output line 146 from the synchronization mutex is in a low state, the two inputs to Muller C-element 184 are high, and the output of the Muller C-element is set to a high state, thus setting the semaphore. Therefore, the output semaphoreVal, representing the value of the hardware semaphore 140 is set. Thus, the original request ReqSET from the first process 110 has been implemented at this stage.

The output of the AND logic gate 182 is set to a high state once the value of the hardware semaphore 140 is set, and consequently the ready input of TriggeredSampling block 186 is set high. This indicates to the TriggeredSampling block 186 that the requested semaphore change has occurred (i.e. the semaphore output has stabilized) and that it is safe to release the synchronization mutex 150.

In response to the ready input of the TriggeredSampling block 186 being set to a high state, the TriggeredSampling block 186 is configured to switch its start output to a low state, and to switch its ReqMutex output to a low state. Thus, the R1 request input line 142 is switched to a low state to release the synchronization mutex 150. By releasing the synchronization mutex 150, the G1 grant output line 146 is switched to a low state, providing a low input at GrMutex, indicating to the TriggeredSampling block 186 that the synchronization mutex 150 has been released. This leaves the synchronization mutex 150 in the unacquired state.

Finally, in response to receiving a low input at GrMutex, the TriggeredSampling block 186 switches its output reqTrigger to a low state, effectively re-setting the WAIT block 185 for receiving the next ReqSET input signal by switching the ctrl input of the WAIT block to a low state. The TriggeredSampling block 186 is then configured to switch its output reqTrigger back to a high state, indicating the TriggeredSampling block 186 is ready to receive another input.

For as long as the TriggeredSampling block 186 has acquired the synchronization mutex 150, the second process 120 cannot acquire it. In this way the semaphore module 130 ensures mutual exclusion between a granted request to set the value of the hardware semaphore 140 and a granted request to clear the value of the hardware semaphore 140.

In summary, the lines in and out of the TriggeredSampling block 186 cycle through the following states in response to a request to set the hardware semaphore 140 (where "+" indicates assertion of the line, and "−" indicates de-assertion of the line):

reqTrigger+→ackTrigger+→ReqMutex+→GrMutex+ →start+→ready+→start−→ready−→ReqMutex− →GrMutex−→reqTrigger−→ackTrigger−→reqTrigger+

The operation of the access control logic 180 in response to a ReqCLEAR signal from the second process 120 is described in further detail below.

As described above in relation to FIG. 3 above, an asserted ReqCLEAR signal results in the R2 request input line 170 of the synchronization mutex 150 being set to a high state. If the synchronization mutex 150 hasn't already been acquired by a different process, the synchronization mutex 150 sets the G2 grant output line 148 to a high state. This passes an asserted GrCLEAR input to the access control logic 180, indicating that the synchronization mutex 150 has been acquired, and thus the request to clear the value of the hardware semaphore 140 has been granted.

The output of the Muller C-element 184 is thus switched to a low state, given that the output start from the TriggeredSampling block 186 will be low, and the request ReqCLEAR is inverted by inverter 183. Therefore, the output semaphoreVal, representing the value of the hardware semaphore 140, is cleared. Thus, the original request ReqSET from the first process 110 has been implemented at this stage.

As described in relation to FIG. 3, the request from the second process 120 is a "blocking" request, meaning that the synchronization mutex 150 is not released automatically by the access control logic 180 after the value of the hardware semaphore 140 has been cleared. Instead, the second process 120 is configured to read the semaphore Val output, and in response to establishing that the value of the hardware semaphore 140 has been cleared, to set the R2 hardware line 170 to a low state to release the synchronization mutex 150. As a result of the synchronization mutex 150 being released, the G2 grant output line 148 from the synchronization mutex 150 is switched to a low state, and the inverted input to the Muller C-element 184 means that the value of the hardware semaphore 140 remains cleared until the first process 110 requests to set the value of the hardware semaphore 140 again.

Figure 5:
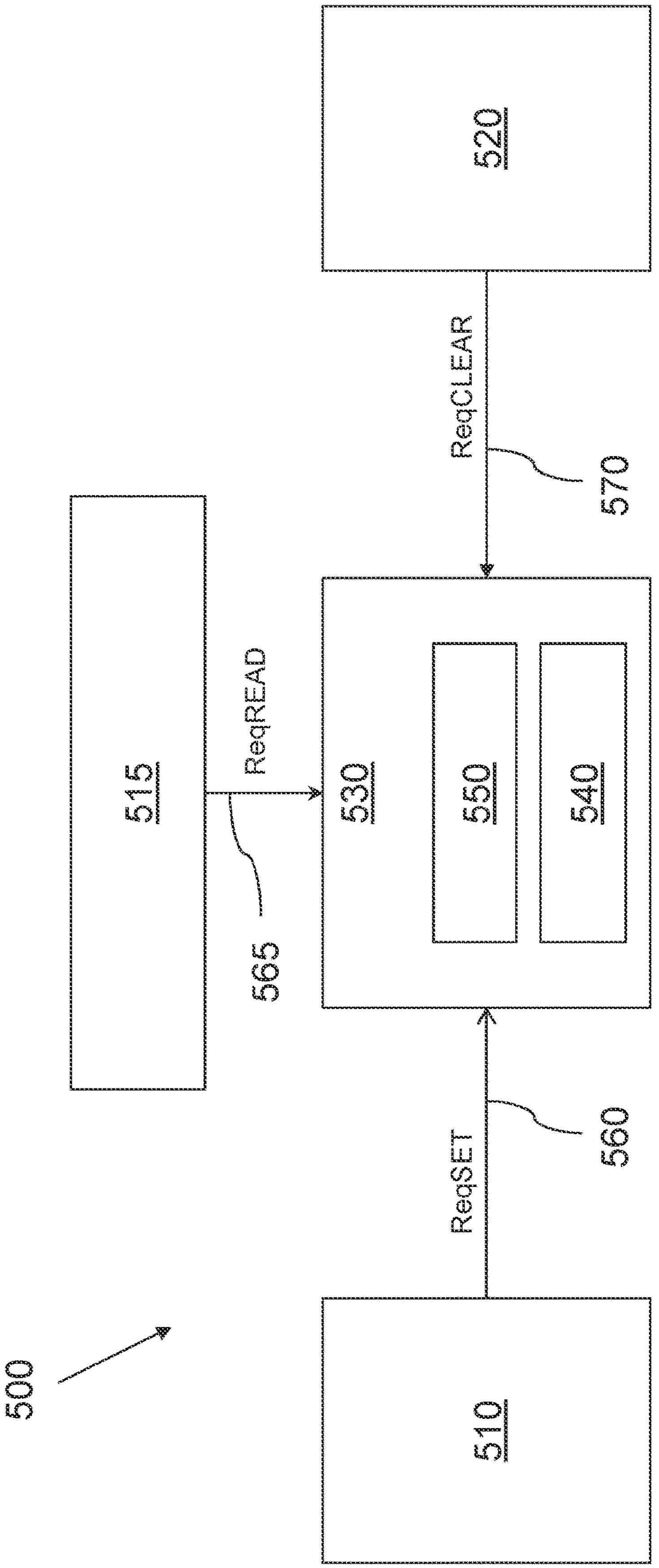
FIG. 5 is a schematic diagram of an IC implemented in accordance with a second embodiment of the invention.

FIG. 5 is a schematic diagram of an IC 500 in accordance with a second embodiment of the invention. This is similar to the IC 100 described above, but has three processes accessing its semaphore module 530, instead of just two processes 110, 120.

In an analogous manner to the IC 100 described above, the IC 500 provides a first process 510 and a second process 520 with access to a semaphore module 530. The processes 510 and 520 may be clocked by independent clocks. The semaphore module 530 comprises a hardware semaphore 540, protected by a three-way synchronization mutex 550. The first process 510 is connected to the semaphore module 530 with a single-bit hardware line 560, and the second process 520 is connected to the semaphore module 530 with a single-bit hardware line 570.

In this second embodiment, the IC 500 comprises a further, third process 515. The third process 515 is connected to the semaphore module 530 with a single-bit hardware line 565. The third process 515 can request to read the hardware semaphore 540 by setting the hardware line 565 to a high state, indicating an asserted request to read the semaphore, ReqREAD.

The first process 510, the second process 520, and the third process 515 may operate in three different, mutually unsynchronized clock domains, or one or more of them may be un-clocked (i.e. using asynchronous logic circuitry). The third process 515 is, at some point in its operation, required to read the value of the hardware semaphore 540. However, due to the lack of low-level synchronization between the three processes 510, 515, 520, the third process 515 may attempt to read the value of the hardware semaphore 540 at the same time as the semaphore 540 is being set in response to a request from the first process 510 or cleared in response to a request from the second process 520. However, the three-way synchronization mutex 550 arbitrates access to the hardware semaphore 540 to stop this scenario from occurring.

Figure 6:
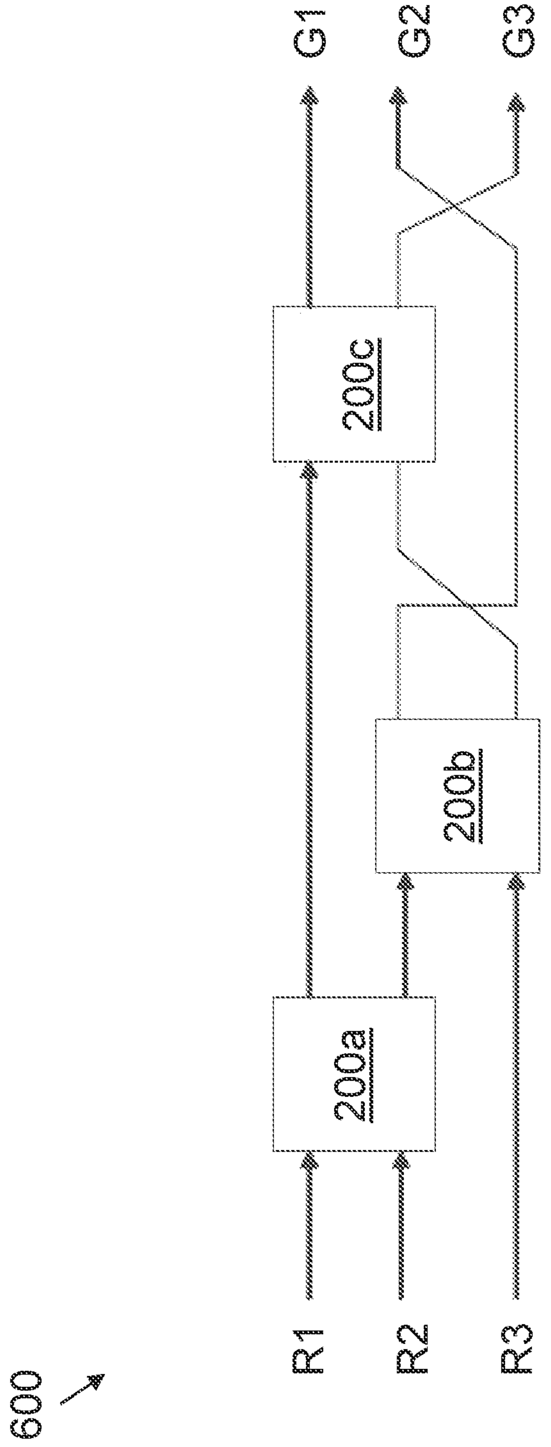
FIG. 6 is a schematic diagram of an exemplary conventional three-way mutex for implementing the synchronization mutex in the semaphore module of FIG. 5.

FIG. 6 shows an example of a conventional three-way mutex 600 that may be used to implement the synchronization mutex 550 in the semaphore module 530. The three-way mutex 600 has three request input lines (labelled as R1, R2 and R3), as well as three grant output lines (labelled as G1, G2 and G3). Like the two-way mutex described with reference to FIG. 2, each request input line has a corresponding grant output line. The mutex element 600 ensures mutual exclusion between granting requests from the three inputs using three mutex elements 200*a*, 200*b* and 200*c*, which each operate in the same manner as the mutex element 200 described with reference to FIG. 2.

Figure 7:
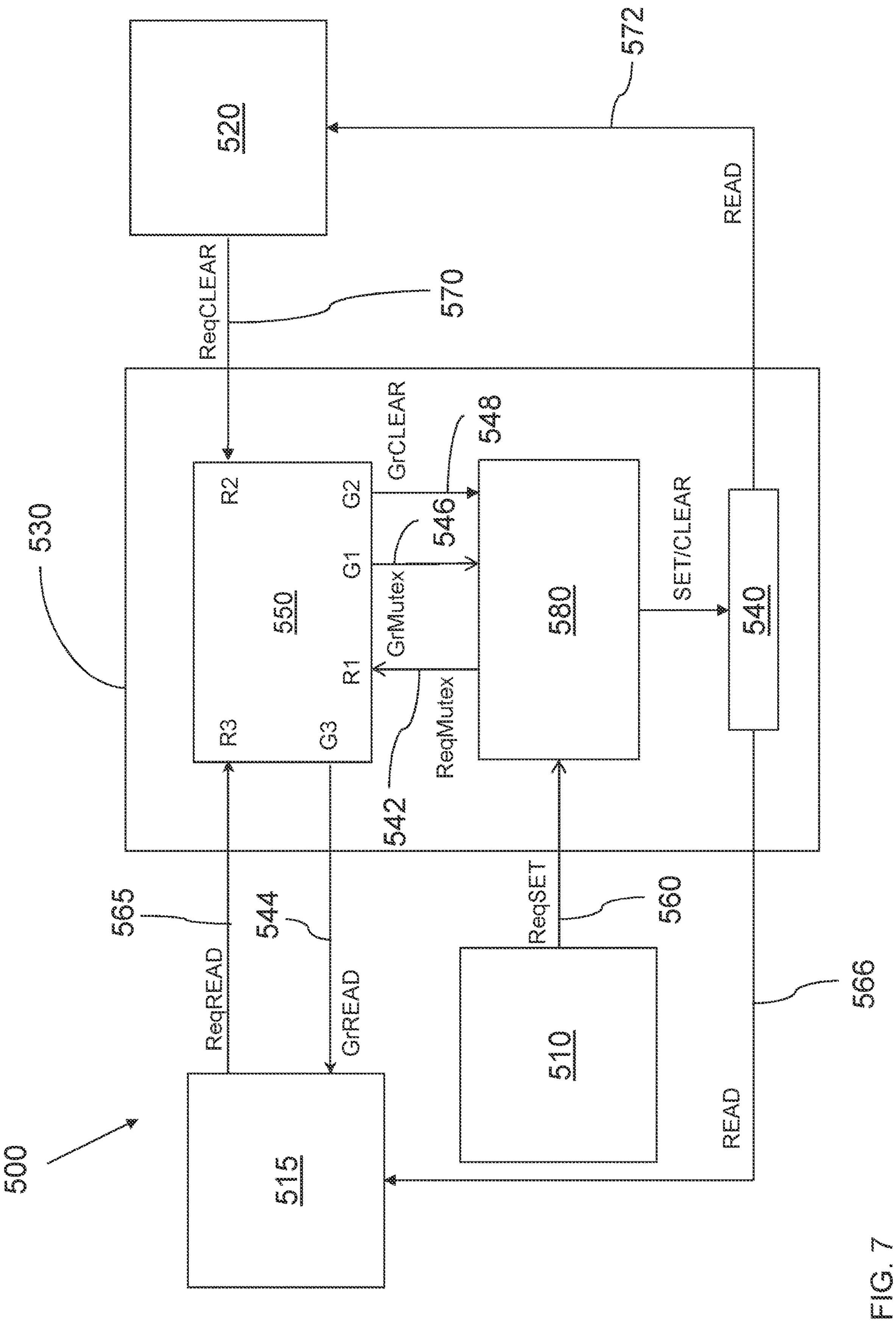
FIG. 7 is a schematic diagram showing the semaphore module of FIGS. 5 and 6 in more detail.

FIG. 7 shows the semaphore module 530 in more detail. In an analogous manner to the IC 100 shown in FIG. 3, the semaphore module 530 comprises the synchronization mutex 550 and the hardware semaphore 540 as shown in FIG. 5, as well as access control logic 580. The first process 510 is connected to the semaphore module 530 via a first hardware logic line 560, and the second process 520 is connected to the semaphore module 530 via a second hardware logic line 570. The second process 520 is also connected to the semaphore module 530 by a further line 572 such that it can read the value of the hardware semaphore 540.

In this second embodiment, the third process 515 is connected to the semaphore module 530 via a third hardware logic line 565, and the third process 515 is also connected to the semaphore module 530 by a line 566 such that it can read the value of the hardware semaphore 540.

The synchronization mutex 550 is implemented in accordance with the three-way mutex element 600 shown in FIG. 6 and has three request input lines 542, 570 and 565 (R1, R2 and R3 respectively), as well as three grant output lines 546 and 548 and 544 (G1, G2 and G3 respectively).

The operation of the semaphore module 530 with respect to requests from the first process 510 and the second process 520, other than the use of a three-way synchronization mutex 550, is the same as described with reference to the IC 100 shown in FIGS. 3 and 4.

With regard to the third process 515, which was not included in the IC 100, the R3 request input line 565 is configured to receive an input ReqREAD (i.e. "request read") from the third process 515 requesting to acquire the synchronization mutex 550, before reading the value of the hardware semaphore 540. The third process 515 is configured to receive a signal GrREAD (i.e. "read granted") from the G3 grant output line 544 of the synchronization mutex to indicate when the synchronization mutex 550 has been successfully acquired.

It can be seen that, for the input ReqREAD received from the third process 515, the third process 515 directly handles the acquisition and release of the process-synchronization mutex 550, and does not attempt to read the value of the hardware semaphore 540 without first acquiring the process-synchronization mutex 550. ReqREAD is a "blocking" request, because the third process 515 holds ReqREAD in a high state until it has observed that the value of the hardware semaphore 140 is set. The third process 515 therefore blocks its own processing whilst waiting for the hardware semaphore 140 to be set. As a result, the process synchronization mutex 550 remains in an acquired state until the third process 515 releases it. Although not shown here, in other embodiments, a request to read the value of the hardware semaphore 540 could be instead implemented as a "non-blocking" request, e.g., by using a WAIT block similar to WAIT block 185 shown in FIG. 4, for receiving and latching a pulsed non-blocking request.

The third process 515 is prevented from reading the hardware semaphore 540 while it is in the process of being set or cleared in response to a request to change the value of the hardware semaphore 540 from another process (e.g. 510, 520). Furthermore, no other process will be granted a request to change the value of the hardware semaphore 540 while the third process 515 is in the process of reading it.

Figure 8:
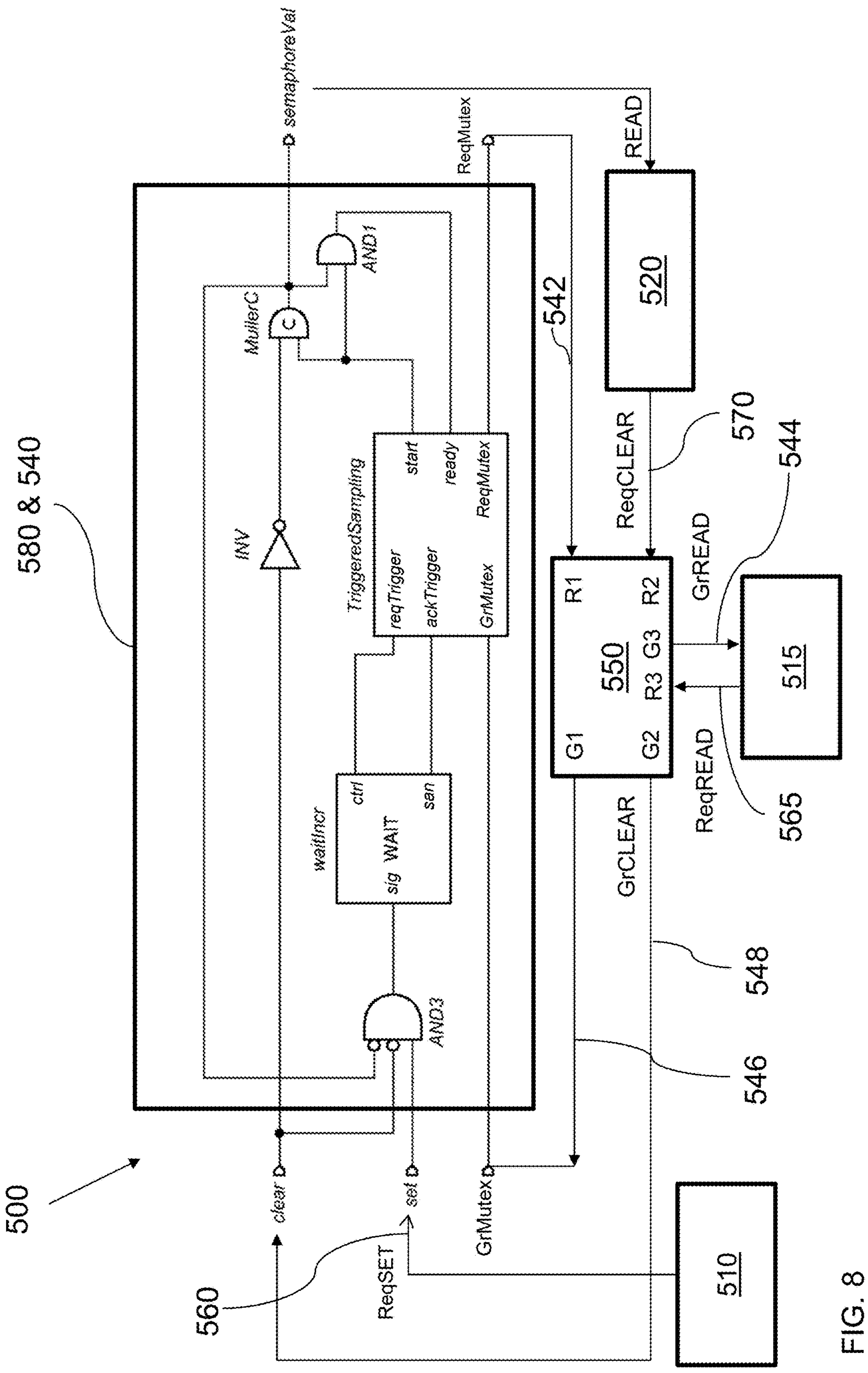
FIG. 8 is a schematic diagram with more detail of the access control logic of FIG. 7.

FIG. 8 shows the detailed hardware implementation of the access control logic 580 of the IC 500 in accordance with the second embodiment of the invention. The access control logic 580 is configured to operate in the same way as the access control logic 180 shown in FIG. 4. In FIG. 8, however, the synchronization mutex 550 is a three-way synchronization mutex implemented in accordance with the example of a three-way mutex shown in FIG. 6. FIG. 8 shows the R3 request input line 565 from the third process 515 to the synchronization mutex 550, and the G3 grant output line 544 from the synchronization mutex 550 to the third process 515.

Figure 9:
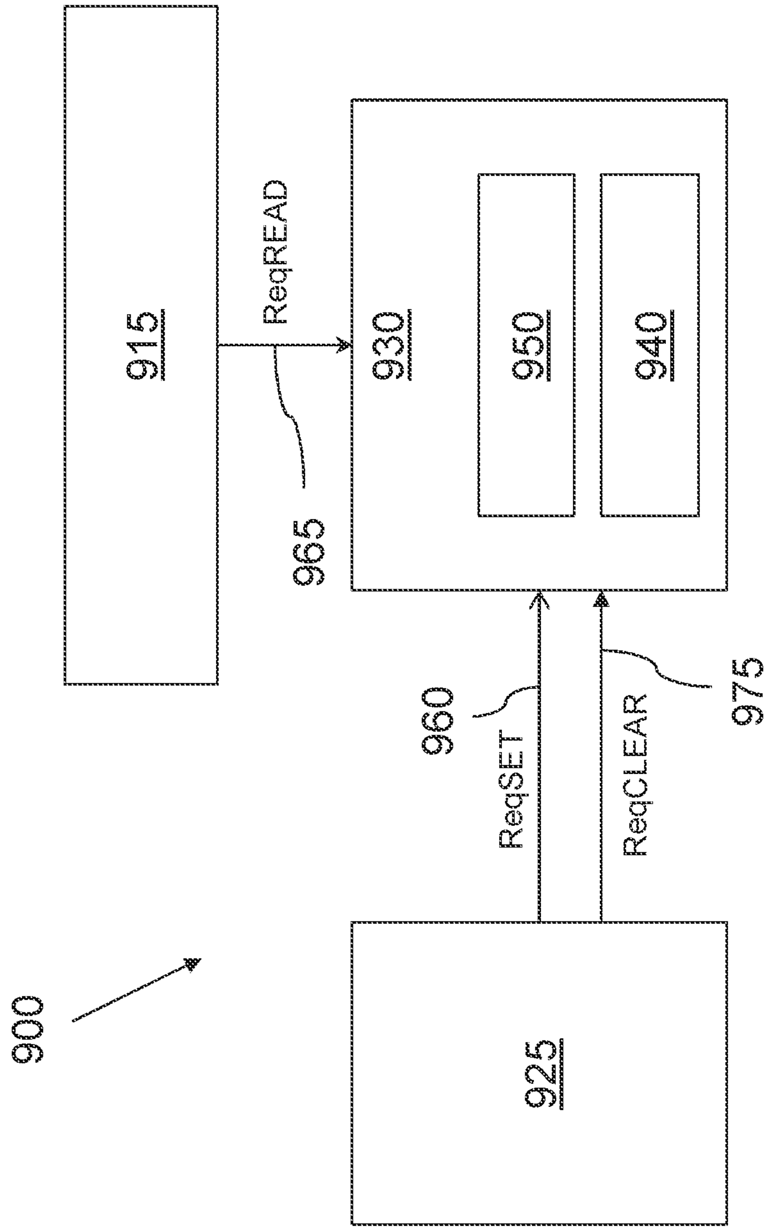
FIG. 9 is a schematic diagram of an IC implemented in accordance with a third embodiment of the invention.

FIG. 9 is a schematic diagram of an IC 900 in accordance with a third embodiment of the invention, having two processes that both issue "non-blocking" requests.

In an analogous manner to the IC 500, a semaphore module 930 comprises a hardware semaphore 940, protected by a synchronization mutex 950. A first process 915 is connected to the semaphore module 930 with a single-bit hardware line 965. The first process 915 can request to read the value of the hardware semaphore 940 by setting the hardware line 965 to a high state, indicating an asserted request to read the semaphore, ReqREAD.

In this third embodiment, the IC 900 comprises a second process 925, which can request to both set and clear the value of the hardware semaphore. The second process 925 can request to set the hardware semaphore 940 by setting the hardware line 960 to a high state, indicating an asserted request to set the semaphore, ReqSET. The second process 925 can request to clear the hardware semaphore 940 by setting the hardware line 975 to a high state, indicating an asserted request to set the semaphore, ReqCLEAR.

During operation of the IC 900, the first process 915 and the second process 925 may be clocked by two independent clocks.

Figure 10:
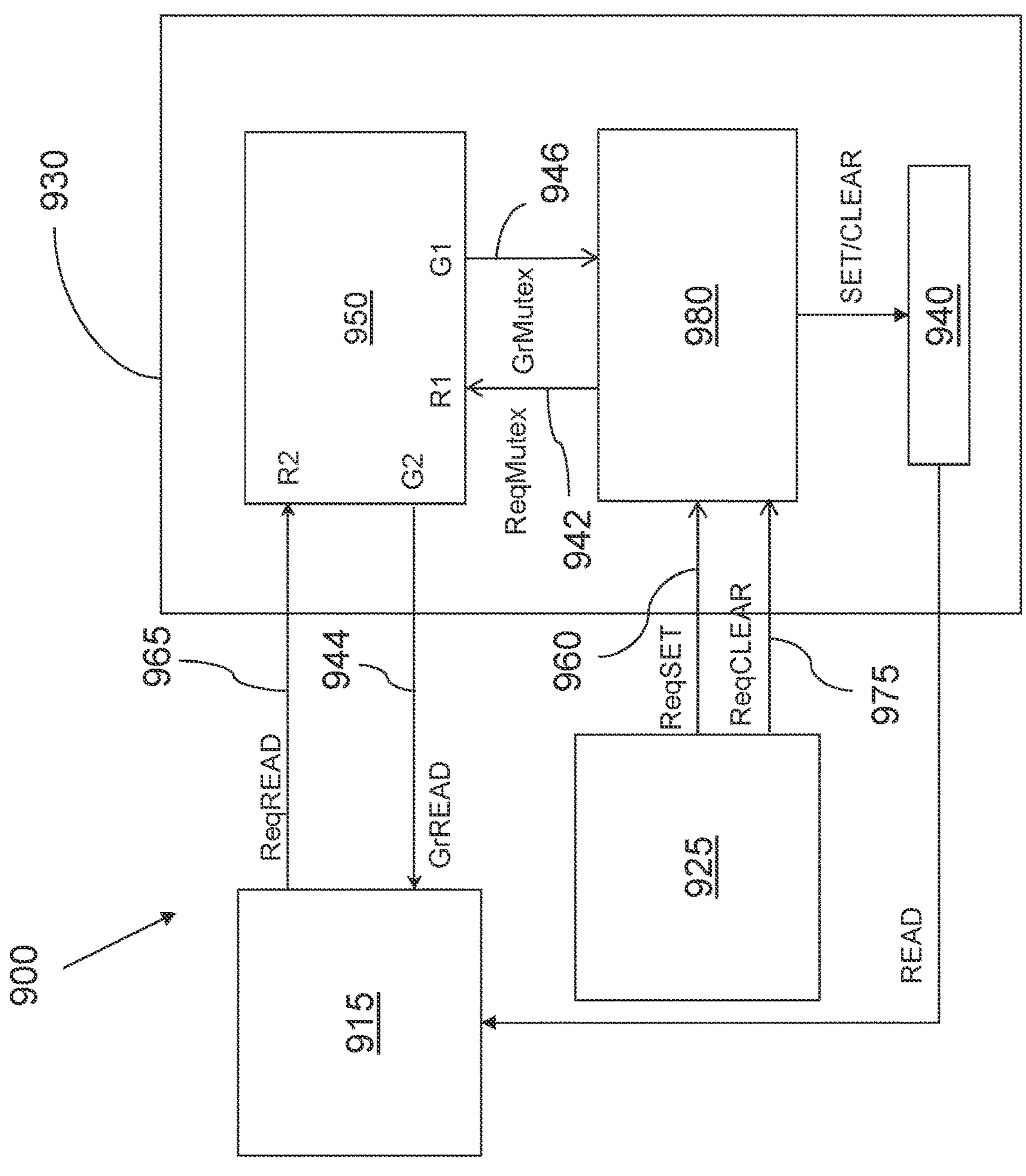
FIG. 10 is a schematic diagram showing the semaphore module of FIG. 9 in more detail.

FIG. 10 is a schematic diagram of the IC 900 implemented in accordance with the third embodiment, showing the semaphore module 930 in more detail. The semaphore module 930 comprises the synchronization mutex 950 and the hardware semaphore 940 as shown in FIG. 9, as well as access control logic 980. The first process 915 is also connected to the semaphore module 930 such that it can read the value of the hardware semaphore 940.

The synchronization mutex 930 is implemented in accordance with the exemplary two-way mutex element 200 shown in FIG. 2. The request input line 942 is configured to receive an input ReqMutex from the access control logic 980 to request acquisition of the synchronization mutex 950, and access control logic 980 is configured to receive in input GrMutex from the G1 grant output line 946 to indicate when the synchronization mutex 950 has been successfully acquired.

In the IC 900, the semaphore module 930 is configured to handle an asserted request to clear the semaphore, ReqCLEAR, in the same way as an asserted request to clear the semaphore, ReqSET. Both the first process 915 and the second process 925 issue "non-blocking" requests, and are handled by the semaphore module in an analogous manner to the process described with reference to ReqSET in the IC 100 and the IC 500.

In response to receiving a request from the second process 925 on either hardware line 960, or hardware line 975, the access control logic 980 is configured to request acquisition of the synchronization mutex 950 via request input line 942, and in response to acquiring the synchronization mutex 950, as indicated via the G1 grant output line 946, is configured to change the value of the hardware semaphore 940 according to the nature of the request from the second process 925.

Figure 11:
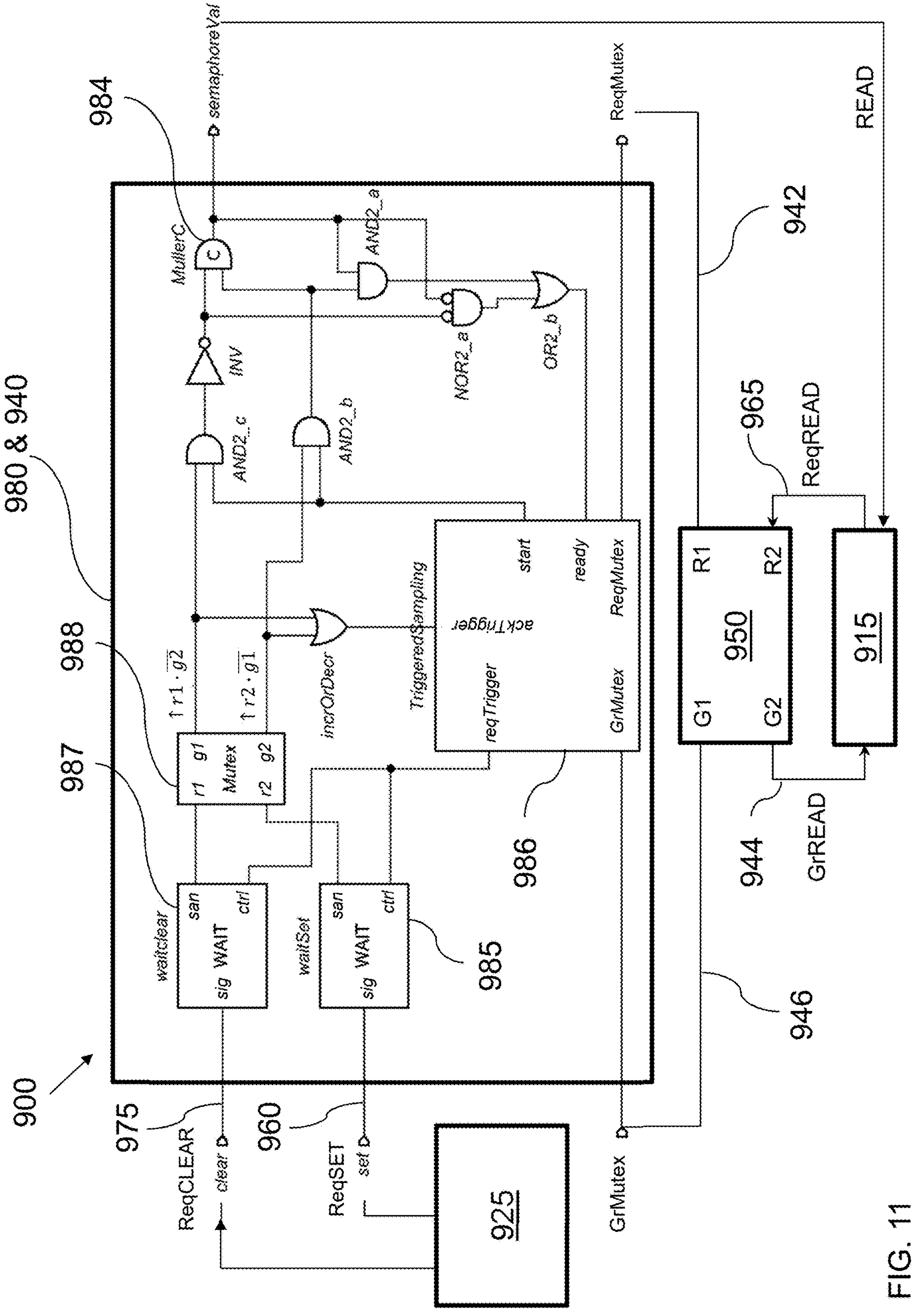
FIG. 11 is a schematic diagram with more detail of the access control logic of FIG. 9.

FIG. 11 shows a detailed hardware implementation of the access control logic 980. The inputs and outputs of the access control logic 980 as the same as those shown in FIG. 10.

The access control logic 980 comprises some of the same components as the access control logic 180 and 580 shown in FIG. 4 and FIG. 8 respectively. A first WAIT block 985 is configured to receive a ReqSET input from the second process 925 via the hardware line 960 requesting to set the semaphore 940. The first WAIT block 985 is configured to respond to its inputs sig and ctrl in the same way as described with reference to the WAIT block 185. The TriggeredSampling block 986 is configured to implement the same sequence of logic in response to its inputs ackTrigger, GrMutex and ready as the TriggeredSampling block 186.

The access control logic 980 further comprises a second WAIT block 987. The sig input of the second WAIT block 987 is configured to receive a ReqCLEAR input from the second process 925 via the hardware line 975, requesting to clear the semaphore block. The second WAIT block 987 is configured to respond to its inputs sig and ctrl in the same way as described with reference to the first WAIT block 985.

The access control logic 980 also comprises an internal semaphore mutex 988. The first input line r1 of the internal semaphore mutex 988 is configured to receive the output signal san of the WAIT block 987, and the second input line r2 of the internal semaphore mutex 988 is configured to receive the output signal san of the WAIT block 985. The internal semaphore mutex 988 is configured in accordance with the standard two-way mutex shown in FIG. 2, thus either the g1 grant output line or the g2 grant output line of the internal semaphore can be set to a high state at any one time. Thus, the internal semaphore mutex 988 provides arbitration between ReqCLEAR and ReqSET, meaning the hardware semaphore 940 can only be either set or cleared at any one time.

The plurality of logic gates shown in FIG. 11 are configured such that after the TriggeredSampling block 986 sets its output start to high, the output of the Muller C-element 984 is either switched to a low state, or a high state, in accordance with a granted request to clear, ReqCLEAR, or a granted request to set, ReqSET, respectively.

Figure 12:
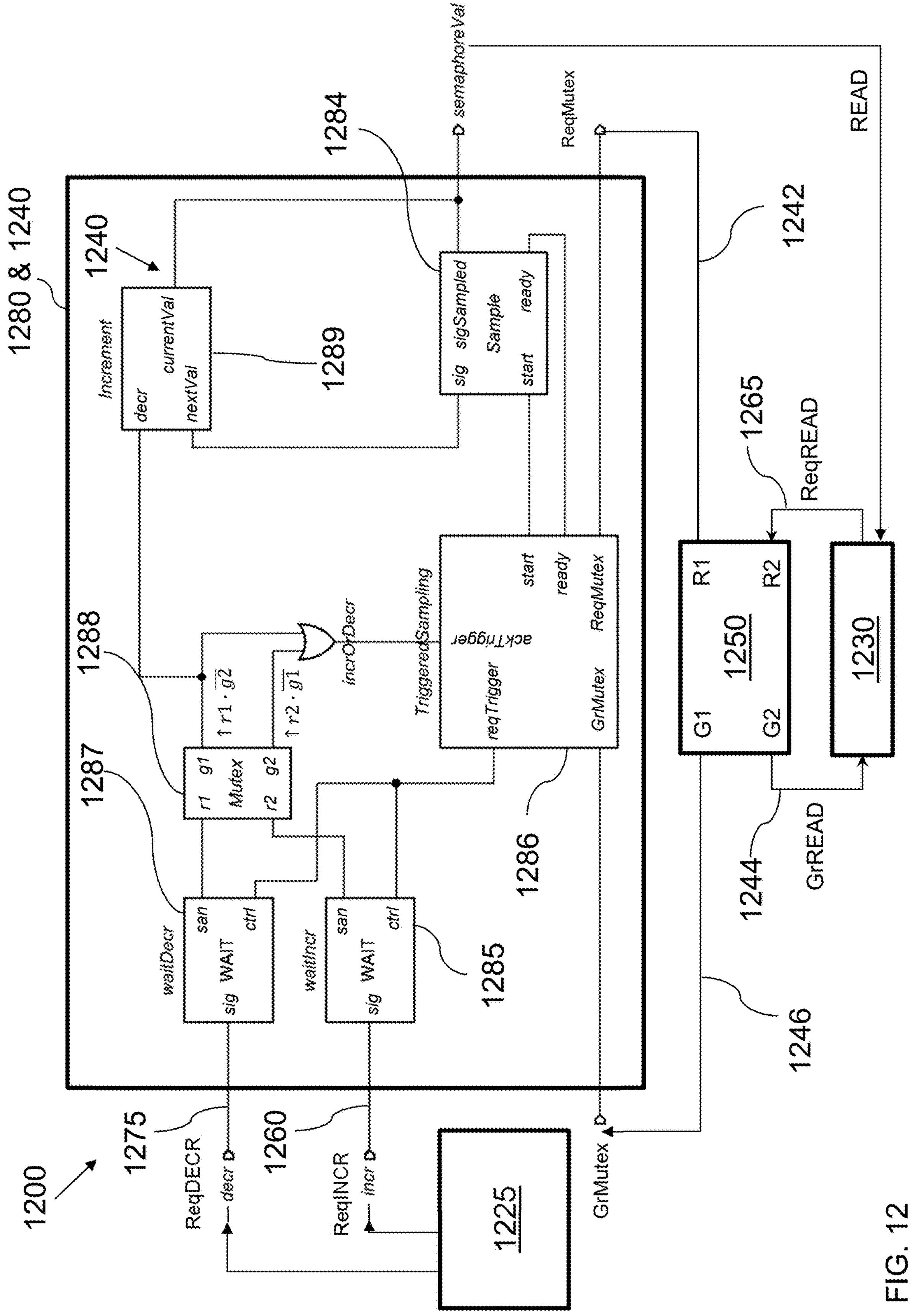
FIG. 12 is a schematic diagram of access control logic in accordance with a fourth embodiment of the invention.

FIG. 12 shows a variation of the detailed hardware implementation of access control logic 1280 which is implemented in an IC 1200 accordance with a fourth embodiment of the invention. The IC 1200 is the same as the IC 900 expect for the fact that the IC 1200 is implemented with a multi-bit hardware semaphore 1240 rather than a single-bit hardware semaphore 940. This semaphore 1240 can hold a value other than just zero and one.

Multi-bit semaphores can be used to synchronize multiple different processes. As an example, a semaphore may be initialized to zero, and two processes may then be initiated. At the point where the two processes need to be synchronized, they may each increment the semaphore by one and wait to read the semaphore as two before proceeding on. The semaphore will be at two only when both processes have reached the synchronization stage. Upon observing a value of two, they can each decrement the semaphore by one and continue on. In this way the semaphore can be used again and again to synchronize the processes at various points. This mechanism, also commonly referred to as a barrier, can be extended to an arbitrary number of N processes. The increment and decrement function is a critical section and once again, the mutual-exclusion problem requires some hardware support to ensure that the different processes don't over-write each other's updates.

In this multi-bit fourth embodiment, the IC 1200 is configured to receive a request ReqINCR to increment the value of the hardware semaphore 1240, and configured to receive a request ReqDECR to decrement the value of the hardware semaphore 1240, rather than the requests ReqSET and ReqCLEAR as described herein with reference to FIGS. 1-11.

The access control logic 1280 comprises some of the same components as the access control logic 980 shown in FIG. 11. The WAIT blocks 1285 and 1287 are configured to respond to their inputs sig and ctrl in the same way as described with reference to the WAIT blocks 985 and 987, and the TriggeredSampling block 1286 is configured to implement the same sequence of logic in response to its inputs reqTrigger, GrMutex and ready as the TriggeredSampling block 986. The internal semaphore mutex 1288 is configured to operate in the same manner as internal semaphore mutex 988.

In FIG. 12, the hardware semaphore comprises an Increment block 1289 and a Sample block 1284 which together provide logic circuitry for either incrementing or decrementing a semaphore value. The value of the hardware semaphore 1240, semaphore Val, corresponds to the multi-line/multi-bit output sigSampled of the Sample block 1284.

The single-line decr input of the Increment block 1289 is configured to receive the output from the g1 grant output line of the internal semaphore mutex 1288. The decr input will thus be set to a high state if a request to decrement the value of the hardware semaphore 1240 has been granted, but will be in a low state otherwise. The multi-line input currentVal of the Increment block 1289 is configured to receive the output sigSampled from the Sample block 1284 (corresponding to the current semaphore value).

The Increment block 1289 is configured, if the decr input is in a high state, to continuously output, on the multi-line nextVal output, one less than the current value of the hardware semaphore 1240 that it receives at the input currentVal. If the decr input is in a low state, it continuously outputs, on the multi-line nextVal output, one more than the current value it receives at the input currentVal.

The sig input of the Sample block 1284 is configured to receive the output nextVal of the Increment block 1289. The start input of the Sample block 1284 is configured to receive an output from the start output of the TriggeredSampling block 1286. The Sample block 1284 is configured, in response to detecting the start input going high, to sample the output nextVal from the Increment block at the sig input, and to output the value sampled at the sig input from the sigSampled output of the Sample block 1284 as the new semaphore value.

After the new value of the hardware semaphore 1240 is stable at the output sigSampled, the Sample block 1284 is configured to set the output ready to a high state to indicate to the TriggeredSampling block 1286 that the value of the hardware semaphore 1240 has been updated. The TriggeredSampling block 1286 is then configured to release the synchronization mutex 1250 as described previously with reference to FIG. 4 and FIG. 9.

Figure 13:
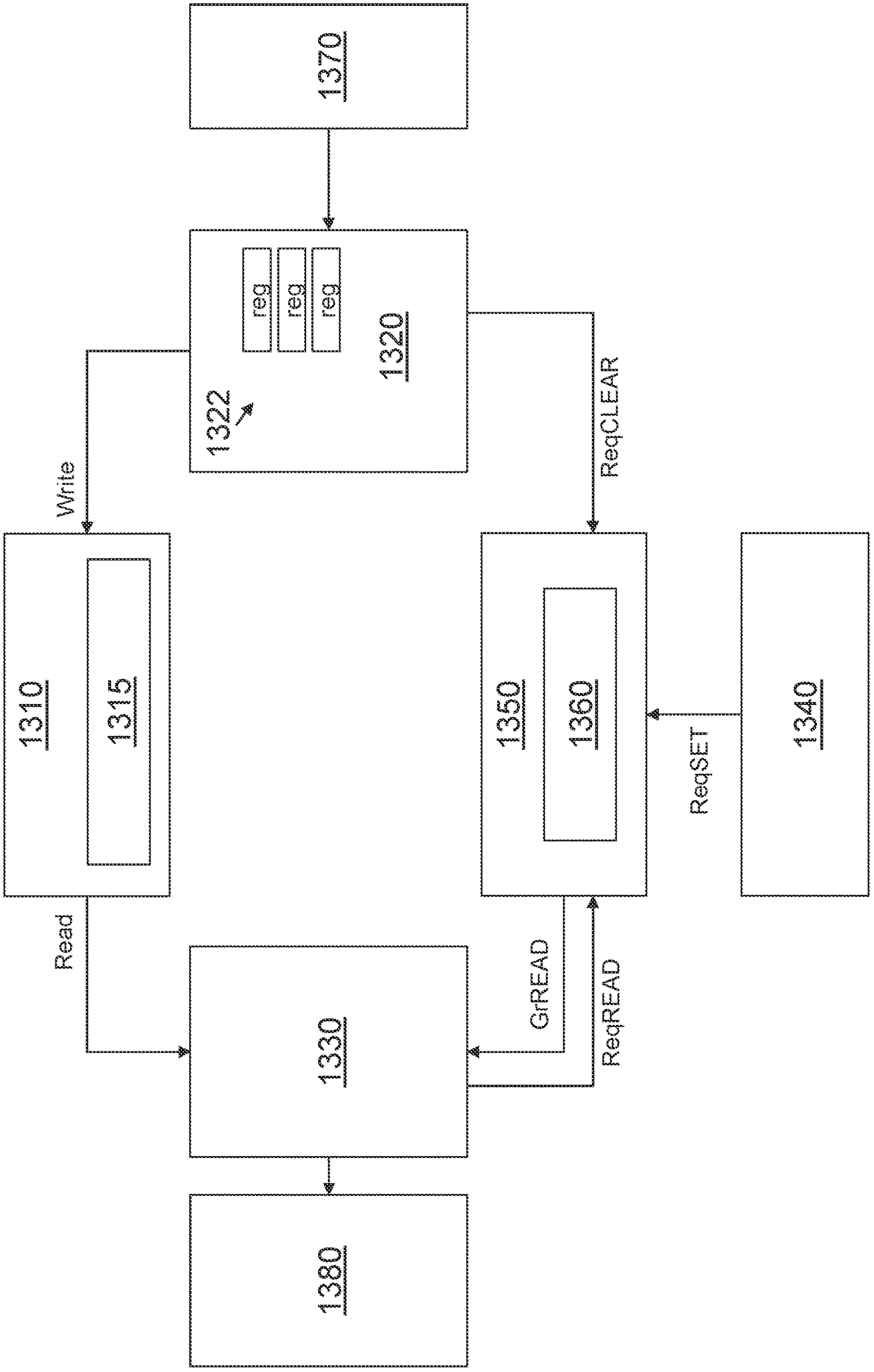
FIG. 13 is a schematic diagram of a radio-on-a-chip embodying the invention.

FIG. 13 shows a high-level schematic diagram of an exemplary radio-on-a-chip 1300 that embodies the invention. The chip 1300 includes conventional features such as one or more processors, memory, bus systems, radio circuitry, peripherals, power and clock management circuitry, etc., but the particular details of these are omitted from FIG. 13 for simplicity.

The integrated circuit 1300 shown in FIG. 13 illustrates an example of how the asynchronous semaphore arbitration mechanism can be used in a system-on-chip (SoC) containing a digital radio. Three exemplary processes are shown, which are not tightly synchronized. A memory 1310, protected by a memory mutex 1315, is shared between a configuration controller 1320 and a channel selection controller 1330. A configuration update controller 1340 is used to synchronize the read and write processes of the configuration controller 1320 and the channel selection controller 1330 accessing the shared memory 1310. A semaphore module 1350 controls access to a configuration update semaphore 1360.

In this example, the configuration controller 1320 has a set of hardware registers 1320 representing a desired configuration of the channel selection controller 1330. The configuration controller 1320 periodically updates its registers 1322 based on a predetermined pattern, and then updates the contents of the memory 1310 with the values in 1322. This predetermined pattern for the register updates can be changed by another process 1370. The configuration controller 1320 is arranged to copy the data from its registers 1322 to the shared memory 1310, for the channel selection controller 1330 to access. The channel selection controller 1330 is arranged to read the latest configuration data from the shared memory 1310 and to implement the sequence of channel selections which is written in the shared memory 1310 in order to operate the radio circuitry 1380.

It is important, however, that this reading of the data from the shared memory 1310 does not occur mid-way through an update by the configuration controller 1320. The memory mutex 1315 is used to ensure that the channel selection controller 1330 does not read the data from the shared memory whilst the configuration controller 1320 is updating it.

The semaphore module 1350 and configuration update semaphore 1360 are used to provide atomicity to the register update process. When the semaphore 1350 is set, this indicates to the configuration controller 1320 that it should retrieve an updated predetermined pattern of register updates from the process 1370. The semaphore 1350 being set also indicates to the channel selection controller 1330 that it should stall reading new values from the shared memory 1310, as they will now be out of date. The configuration update controller 1340 can access the semaphore module 1350 to request that the semaphore 1360 be set. The configuration controller 1320 can access the semaphore module 1350 to request that the semaphore 1360 be cleared. The channel selection controller 1330 can access the semaphore module 1350 to request to read the value of the configuration update semaphore 1350.

During operation, the configuration update controller 1340 determines that the configuration controller 1320 and the channel selection controller 1330 need to synchronize (e.g. in response to detecting some change occurring). To signal this to the controllers 1320, 1330, it requests to set the configuration update semaphore 1360. This indicates that the configuration controller 1320 must retrieve a new predetermined pattern from 1370 for updating the registers 1322, and must also update the memory 1310 with the first value in this new pattern. This further indicates that the channel selection controller 1330 must wait to read the latest configuration data from the shared memory 1310 before going forward. The configuration update controller 1340 requests the synchronization mutex in the semaphore module 1350, and upon being granted it, sets the configuration update semaphore 1360.

Whenever it needs to access configuration data from the shared memory 1310, the channel selection controller 1330 first requests the memory mutex 1315. When the channel selection controller 1330 acquires the memory mutex 1315, it next checks whether the configuration update semaphore 1360 is set, before reading the memory 1310. To read the configuration update semaphore 1360, it requests and acquires the synchronization mutex. This is the point where the channel selection controller 1330 and configuration controller 1320 must be synchronized. If the semaphore 1360 is not set, the channel selection controller 1330 reads the data from memory 1310 and releases the memory mutex 1315. If the semaphore 1360 is set, the channel selection controller 1330 knows that the configuration data in the memory 1310 is in the process of being updated, and so aborts the read operation. It then releases the memory mutex 1315 and starts periodically requesting the memory mutex 1315.

In parallel with this (and potentially clocked independently), the configuration controller 1320 observes the configuration update semaphore 1360 is set and requests the memory mutex 1315. If the configuration controller 1320 obtains the memory mutex 1315, it receives the new register-update-pattern from 1370, generates the values for the registers 1322 from this pattern, and then writes configuration data from the registers 1322 to the shared memory 1310. It then requests the synchronization mutex in order to clear the configuration update semaphore 1360, before then releasing the memory mutex 1315.

If the configuration update controller 1340 had set the semaphore without there being a synchronization mutex in the semaphore module 1350 to implement a sync-semaphore-critical-section, then the semaphore value 1360 could change while the channel selection controller 1330 was checking the value of the semaphore 1360. This would be problematic in situations where the read (or write) process needs to access the value of the semaphore multiple times in succession, instead of reading (or writing) it just once, as the risk of a collision leading to an error would be higher.

If the channel selection controller 1330 is implemented as a hardware process, the value of the semaphore 1360 may be output to two or more different logic gates, which thereafter generate two or more different respective outputs which depend on the value of the semaphore 1306. In this scenario, when the semaphore value changes, it is possible that the one or more of the different logic gates effectively read a different value of the semaphore due to slight variations in wire lengths or gate delays. This could thus result in conflicting outputs. Therefore, it is important that when two or more gates need to output a signal dependent on the value of the semaphore, and be interpreted in combination, that the value of the semaphore is not changing at the same time. Using the synchronization mutex 1350 to arbitrate access to the semaphore ensures that the output of the semaphore value is not read at the same time as it is changing.

With the present synchronization mutex, such multiple accesses may be performed atomically by a process acquiring the synchronization mutex, then performing the succession of accesses, and only then releasing the synchronization mutex.

While the mutexes and semaphore in FIG. 13 are implemented in hardware, the read, write and sync processes carried out by the controllers 1320, 1330, 1340 may be implemented in software or hardware. Although FIG. 13 shows only one shared resource (i.e. the memory 1310) and two processes 1320, 1330 accessing the shared resource 1310, it will be appreciated the principles disclosed here can be extended to protect more shared resources and to support access by additional processes.

It will be appreciated by those skilled in the art that the invention has been illustrated by describing one or more specific embodiments thereof, but is not limited to these embodiments; many variations and modifications are possible, within the scope of the accompanying claims.

I claim:

1. An integrated circuit comprising:

a hardware semaphore configured to store a value; and asynchronous hardware logic circuitry for operating the hardware semaphore, wherein the asynchronous hardware logic circuitry comprises:

a hardware synchronization mutex, switchable between any of one or more acquired states and an unacquired state;

a first input for receiving requests to change the value of the hardware semaphore;

a hardware latch; and sampling logic for sampling the hardware latch;

wherein the asynchronous hardware logic circuitry is configured, in response to receiving a request to change the value of the hardware semaphore at the first input, to set the hardware latch to hold the request, wherein the asynchronous hardware logic circuitry is further configured, when the synchronization mutex is in the unacquired state, to sample the hardware latch to detect a request to change the value of the hardware semaphore, using the sampling logic, and in response to detecting the request:

to switch the synchronization mutex to a first acquired state;

then to change the value of the hardware semaphore in response to the request; and then to switch the synchronization mutex to the unacquired state, and wherein the asynchronous hardware logic circuitry is further configured, when the synchronization mutex is in an acquired state, to wait until the hardware semaphore has been changed in response to a preceding request, such that the synchronization mutex is no longer in an acquired state, then to sample the hardware latch to detect a request to change the value of the hardware semaphore using the sampling logic, and in response to detecting the request:

to switch the synchronization mutex to the first acquired state;

then to change the value of the hardware semaphore in response to the request; and then to switch the synchronization mutex to the unacquired state.

2. The integrated circuit of claim 1, wherein the asynchronous hardware logic circuitry is configured to receive requests to change the value of the hardware semaphore from any of a plurality of sources.

3. The integrated circuit of claim 1, wherein the asynchronous hardware logic circuitry comprises a plurality of inputs, including the first input, for receiving requests to change the value of the hardware semaphore.

4. The integrated circuit of claim 1, wherein the integrated circuit comprises a processor and wherein the asynchronous hardware logic circuitry is configured to receive requests to change the value of the hardware semaphore from a software process executing on the processor.

5. The integrated circuit of claim 1, wherein the asynchronous hardware logic circuitry is configured to receive requests to change the value of the hardware semaphore from hardware circuitry of the integrated circuit.

6. The integrated circuit of claim 1, wherein the asynchronous hardware logic circuitry comprises logic for detecting that the synchronization mutex is in the first acquired state before changing the value of the hardware semaphore in response to the request.

7. The integrated circuit of claim 1, wherein the asynchronous hardware logic circuitry comprises logic for verifying that the value of the hardware semaphore has been changed, in response to the request, before switching the synchronization mutex to the unacquired state.

8. The integrated circuit of claim 1, wherein the asynchronous hardware logic circuitry comprises an output for indicating whether the synchronization mutex is in an acquired state.

9. The integrated circuit of claim 1, wherein the asynchronous hardware logic circuitry comprises an input for receiving requests to read the value of the hardware semaphore.

10. The integrated circuit of claim 9, wherein the asynchronous hardware logic circuitry is configured, in response to receiving a request to read the value of the hardware semaphore, if the synchronization mutex is in the unacquired state, to switch the synchronization mutex to an acquired state and to output an indication that the mutex is in the acquired state.

11. The integrated circuit of claim 9, wherein the asynchronous hardware logic circuitry is configured to receive requests to read the value of the hardware semaphore from any of a plurality of sources.

12. The integrated circuit of claim 1, wherein the asynchronous hardware logic circuitry is configured to set the latch in response to receiving a request to read the value of the hardware semaphore at a further input of the asynchronous hardware logic circuitry.

13. The integrated circuit of claim 1, wherein the asynchronous hardware logic circuitry is configured, in response to receiving a request to change the value of the hardware semaphore, if the synchronization mutex is in the unacquired state:

to switch the synchronization mutex to the first acquired state;

then to change the value of the hardware semaphore in response to the request; and then, in response to a cessation of the request to change the value of the hardware semaphore, to switch the synchronization mutex to the unacquired state.

14. The integrated circuit of claim 1, wherein the request to change the value of the hardware semaphore, received at the first input, is a request to increment the value of the hardware semaphore, and wherein the first input is arranged only to receive requests to increment the value of the hardware semaphore.

15. The integrated circuit of claim 14, wherein the asynchronous hardware logic circuitry comprises a second input for receiving requests to decrement the value of the hardware semaphore, and wherein the asynchronous hardware logic circuitry is configured, in response to receiving a request to decrement the value of the hardware semaphore at the second input, if the synchronization mutex is in the unacquired state:

to switch the synchronization mutex to an acquired state;

then to decrement the value of the hardware semaphore in response to the request; and then to switch the synchronization mutex to the unacquired state, and if the synchronization mutex is in an acquired state, not to decrement the value of the hardware semaphore in response to the request, at least while the synchronization mutex remains in the acquired state.

16. The integrated circuit of claim 1, wherein the hardware semaphore is configured to store a multi-bit value.

17. The integrated circuit of claim 1, wherein the asynchronous hardware logic circuitry comprises access control circuitry, separate from the synchronization mutex, for controlling access to the synchronization mutex or the hardware semaphore, wherein the access control circuitry comprises a mutex-request output that is coupled to a first mutex-request input of the synchronization mutex, and is configured to use the mutex-request output to switch the synchronization mutex to the first acquired state in response to the request to change the value of the hardware semaphore received at the first input.

18. The integrated circuit of claim 17, wherein the asynchronous hardware logic circuitry further comprises a second input for receiving requests to change the value of the hardware semaphore, and is configured to pass requests received at the second input directly to a second mutex-request input of the synchronization mutex without passing through the access control circuitry, and wherein the synchronization mutex comprises a second mutex-grant output, corresponding to the second mutex-request input, that is coupled to the access control circuitry for use by the access control circuitry in determining when to change the value of the hardware semaphore in response to a request received at the second input.

* * * * *